United States Patent
Yang

(10) Patent No.: US 10,768,333 B2
(45) Date of Patent: Sep. 8, 2020

(54) DETERMINING A FULL ELECTROMAGNETIC COUPLING TENSOR USING MULTIPLE ANTENNAS

(71) Applicant: Oliden Technology, LLC, Sugar Land, TX (US)

(72) Inventor: Jian Yang, Sugar Land, TX (US)

(73) Assignee: Oliden Technology, LLC, Stafford, TX (US)

( * ) Notice: Subject to any disclaimer, the term of this patent is extended or adjusted under 35 U.S.C. 154(b) by 733 days.

(21) Appl. No.: 15/236,682

(22) Filed: Aug. 15, 2016

(65) Prior Publication Data
US 2017/0052273 A1 Feb. 23, 2017

Related U.S. Application Data

(60) Provisional application No. 62/208,450, filed on Aug. 21, 2015, provisional application No. 62/210,136, filed on Aug. 26, 2015.

(51) Int. Cl.
*G01V 3/28* (2006.01)
*G01V 3/30* (2006.01)

(52) U.S. Cl.
CPC ........................... *G01V 3/30* (2013.01)

(58) Field of Classification Search
CPC .................. G01V 3/30; G01V 3/28
See application file for complete search history.

(56) References Cited

U.S. PATENT DOCUMENTS

| | | | | |
|---|---|---|---|---|
| 2009/0309600 A1* | 12/2009 | Seydoux | ................ | G01V 3/30 324/338 |
| 2011/0140701 A1* | 6/2011 | Legendre | ................ | G01V 3/28 324/339 |
| 2014/0107929 A1* | 4/2014 | Zhong | ................ | G01V 3/26 702/7 |
| 2014/0292341 A1* | 10/2014 | Yang | ................ | G01V 3/28 324/339 |

* cited by examiner

*Primary Examiner* — Regis J Betsch
*Assistant Examiner* — Jeremy A Delozier
(74) *Attorney, Agent, or Firm* — Bryan L. White

(57) ABSTRACT

A downhole electromagnetic logging tool having two or more antenna groups spaced along a longitudinal axis of the logging tool, each antenna group having one antenna or multiple antennas proximally located or collocated, each antenna group having at least one tilted antenna, at least one antenna group having, in addition to the tilted antenna, at least one transverse or axial antenna, and any given pair of antenna groups comprising at least four antennas is disclosed. The logging tool is disposed in a wellbore penetrating a formation and, while rotating, measures a tool rotation angle, transmits an electromagnetic signal from one antenna group, and receives the electromagnetic signal with another antenna group. Elements of an electromagnetic coupling tensor are determined using the received electromagnetic signal and the measured tool rotation angle, and properties of the formation using one or more elements of the determined electromagnetic coupling tensor are inferred.

20 Claims, 10 Drawing Sheets

Figure 1A
(Prior Art)
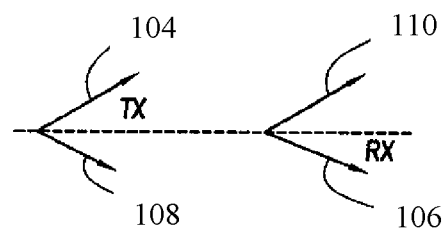
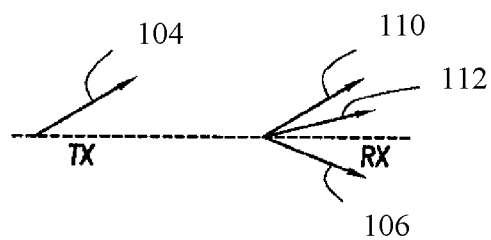
Figure 1B
(Prior Art)

Steps in Figure 10A

Determine coefficients $V_0^{T_1R_1}$, $V_{1c}^{T_1R_1}$, $V_{1s}^{T_1R_1}$, $V_{2c}^{T_1R_1}$ and $V_{2s}^{T_1R_1}$ from the induced voltage $V^{T_1R_1}$ at a plurality of azimuth angles, coefficients $V_0^{T_2R_1}$, $V_{1c}^{T_2R_1}$, $V_{1s}^{T_2R_1}$, $V_{2c}^{T_2R_1}$ and $V_{2s}^{T_2R_1}$ from the induced voltage $V^{T_2R_1}$ at a plurality of azimuth angles, and coefficients $V_0^{T_1R_2}$, $V_{1c}^{T_1R_2}$, $V_{1s}^{T_1R_2}$, $V_{2c}^{T_1R_2}$ and $V_{2s}^{T_1R_2}$ from the induced voltage $V^{T_1R_2}$ at a plurality of azimuth angles.

Solve for $V_{xy}^{T_1R_1} + V_{yx}^{T_1R_1}$ and $V_{xx}^{T_1R_1} - V_{yy}^{T_1R_1}$ from coefficients $V_{2c}^{T_1R_1}$ and $V_{2s}^{T_1R_1}$ for T1 and R1, $V_{xy}^{T_2R_1} + V_{yx}^{T_2R_1}$ and $V_{xx}^{T_2R_1} - V_{yy}^{T_2R_1}$ from coefficients $V_{2c}^{T_2R_1}$ and $V_{2s}^{T_2R_1}$ for T2 and R1, and $V_{xy}^{T_1R_2} + V_{yx}^{T_1R_2}$ and $V_{xx}^{T_1R_2} - V_{yy}^{T_1R_2}$ from coefficients $V_{2c}^{T_1R_2}$ and $V_{2s}^{T_1R_2}$ for T1 and R2.

Determine the gain $G_{T_2R_1}^{T_1R_1}$ using $\frac{V_{xx}^{T_1R_1} - V_{yy}^{T_1R_1}}{V_{xx}^{T_2R_1} - V_{yy}^{T_2R_1}}$, or $\frac{V_{xy}^{T_1R_1} + V_{yx}^{T_1R_1}}{V_{xy}^{T_2R_1} + V_{yx}^{T_2R_1}}$, and the gain $G_{T_1R_2}^{T_1R_1}$ using $\frac{V_{xx}^{T_1R_1} - V_{yy}^{T_1R_1}}{V_{xx}^{T_1R_2} - V_{yy}^{T_1R_2}}$, or $\frac{V_{xy}^{T_1R_1} + V_{yx}^{T_1R_1}}{V_{xy}^{T_1R_2} + V_{yx}^{T_1R_2}}$.

Solve for $V_{xz}^{T_1R_1}$, $V_{yz}^{T_1R_1}$, $V_{zx}^{T_1R_1}$, and $V_{zy}^{T_1R_1}$ from coefficients $V_{1c}^{T_1R_1}$, $V_{1s}^{T_1R_1}$, $V_{1c}^{T_2R_1}$ and $V_{1s}^{T_2R_1}$, and the gain factor $G_{T_2R_1}^{T_1R_1}$.

Solve for $V_{zz}^{T_1R_1}$, $V_{xy}^{T_1R_1} - V_{yx}^{T_1R_1}$ and $V_{xx}^{T_1R_1} + V_{yy}^{T_1R_1}$ from coefficients $V_0^{T_1R_1}$, $V_0^{T_2R_1}$ and $V_0^{T_1R_2}$ using gain $G_{T_2R_1}^{T_1R_1}$ and $G_{T_1R_2}^{T_1R_1}$.

Solve for $V_{xy}^{T_1R_1}$, $V_{yx}^{T_1R_1}$, $V_{xx}^{T_1R_1}$, and $V_{yy}^{T_1R_1}$ from $V_{xy}^{T_1R_1} + V_{yx}^{T_1R_1}$, $V_{xx}^{T_1R_1} - V_{yy}^{T_1R_1}$, $V_{xy}^{T_1R_1} - V_{yx}^{T_1R_1}$, and $V_{xx}^{T_1R_1} + V_{yy}^{T_1R_1}$.

Figure 10E ated generally to the field of downhole logging tools and particularly to downhole electromagnetic logging tools. Specifically, various techniques to determine a full electromagnetic coupling tensor of an earth formation using a tool comprising multiple antennas disposed in a borehole are disclosed.

DETERMINING A FULL ELECTROMAGNETIC COUPLING TENSOR USING MULTIPLE ANTENNAS

CROSS-REFERENCE TO RELATED APPLICATIONS

This application claims, under 35 U.S.C. § 119, priority to and the benefit of U.S. Provisional Patent Application No. 62/208,450, filed Aug. 21, 2015, and U.S. Provisional Patent Application No. 62/210,136, filed Aug. 26, 2015.

FIELD OF THE INVENTION

The present disclosure relates generally to the field of downhole logging tools and particularly to downhole electromagnetic logging tools. Specifically, various techniques to determine a full electromagnetic coupling tensor of an earth formation using a tool comprising multiple antennas disposed in a borehole are disclosed.

BACKGROUND

Various well logging techniques are known in the field of hydrocarbon exploration and production. These techniques use instruments or tools equipped with transmitters adapted to emit energy into a subsurface formation that has been penetrated by a borehole. In this description, "instrument" and "tool" will be used interchangeably to indicate, for example, an electromagnetic instrument (or tool), a wireline tool (or instrument), or a logging-while-drilling tool (or instrument). The emitted energy interacts with the surrounding formation to produce signals that are then detected and measured by one or more sensors. By processing the detected signal data, a profile of formation properties can be generated.

Electromagnetic logging tools, including electromagnetic induction and wave propagation logging tools, are used to determine the electrical properties of formations surrounding a borehole. Such logging tools obtain measurements relating to the resistivity (or its inverse, conductivity) of the formation that, when interpreted, allow one to infer various petrophysical properties of the formation and fluids therein. The physical principles of electromagnetic induction resistivity well logging are well known.

Electromagnetic logging tools use transmitter and receiver antennas. In some embodiments, such antennas may be operable as a transmitter and/or a receiver. Those skilled in the art will appreciate that an antenna may be used as a transmitter at one instant and as a receiver at another. It will also be appreciated that the transmitter-receiver configurations disclosed herein are interchangeable due to the principle of reciprocity, i.e., the "transmitter" may be used as a "receiver", and vice-versa.

Conventional electromagnetic logging tools employ axial transmitter and receiver antennas having magnetic dipole moments substantially along the longitudinal axis of the tool. Such tools do not have azimuthal sensitivity. In high angle or horizontal wells, measurements obtained with axial antennas do not contain information about the directionality of the formation that allows distinguishing whether the borehole is approaching, for example, an electrically conductive layer from above or below. Such information is used, for example, in well placement applications. Logging tools comprising one or more antennas having a magnetic dipole moment tilted or transverse with respect to the tool axis, such as those described, for example, in U.S. Pat. Nos. 5,508,616, 6,163,155, 6,476,609, 7,656,160, 8,466,683, 7,755,361, U.S. Pat. Pub. No. 20140292340, and U.S. Pat. No. 9,389,332 have been proposed. Such logging tools can provide a directional measurement containing information about the directionality of the formation. It further provides more information used for various formation evaluation applications.

For example, in U.S. Pat. Nos. 7,656,160, 7,755,361, and 8,466,683, methods of using a logging tool having three tilted transmitter (receiver) coils and a tilted receiver (transmitter) coil in rotation are proposed to determine a full tensor of the electromagnetic field coupling, which in turn is used to determine the subsurface formation properties. The "tilted" transmitter and receiver coils have magnetic moments having non-zero components along the z-axis, i.e., the tool rotation axis, but not entirely aligned with the z-axis. For illustration, two embodiments from U.S. Pat. No. 7,755,361 are shown in FIGS. 1A and 1B. FIG. 1A shows two tilted transmitters 104, 108 and two tilted receivers 106, 110, while FIG. 1B shows one tilted transmitter 104 and three tilted receivers 106, 110, 112.

SUMMARY

A downhole electromagnetic logging tool having two or more antenna groups spaced along a longitudinal axis of the logging tool, each antenna group having one antenna or multiple antennas proximally located or collocated, each antenna group having at least one antenna having a dipole moment that is tilted relative to the longitudinal axis of the logging tool, at least one antenna group having, in addition to the at least one antenna having a dipole moment that is tilted relative to the longitudinal axis of the logging tool, at least one antenna having a dipole moment that is transverse or axial relative to the longitudinal axis of the logging tool, and any given pair of antenna groups comprising at least four antennas is disclosed. The logging tool is disposed in a wellbore penetrating a formation and, while rotating, measures a tool rotation angle, transmits an electromagnetic signal from one antenna group, and receives the electromagnetic signal with another antenna group. Some or all elements of an electromagnetic coupling tensor are determined using the received electromagnetic signal and the measured tool rotation angle, and properties of the formation using one or more elements of the determined electromagnetic coupling tensor are inferred.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion. Embodiments of determining are described with reference to the following figures. The same numbers are generally used throughout the figures to reference like features and components. Embodiments of a system and method to determine all nine elements of an electromagnetic (EM) tensor are described with reference to the following figures.

FIG. 1A is a schematic drawing of a prior art electromagnetic logging tool having two tilted transmitters and two tilted receivers.

FIG. 1B is a schematic drawing of a prior art electromagnetic logging tool having one tilted transmitter and three tilted receivers.

FIG. 10E shows a portion of a flow chart that may be used to determine an electromagnetic coupling tensor, in accordance with the present disclosure.

DETAILED DESCRIPTION

In the following description, numerous details are set forth to provide an understanding of the present disclosure. However, it will be understood by those skilled in the art that the present disclosure may be practiced without these details and that numerous variations or modifications from the described embodiments are possible.

A system and method to determine all nine elements of an electromagnetic (EM) tensor from a transmitter T1 and a receiver R1: $V_{xx}^{T_1R_1}$, $V_{xy}^{T_1R_1}$, $V_{xz}^{T_1T_2}$, $V_{yx}^{T_1R_1}$, $V_{yy}^{T_1R_1}$, $V_{yz}^{T_1R_1}$, $V_{zx}^{T_1R_1}$, $V_{zy}^{T_1R_1}$, and $V_{zz}^{T_1R_1}$ for the case in which multiple transmitters are in proximity or collocated is disclosed herein. Furthermore, since the relative gain factors, e.g., $G_{T_1R_1}^{T_2R_1}$ and $G_{T_1R_1}^{T_3R_1}$, can be determined, any of the non-zero elements of the EM tensor from a transmitter T2 and receiver R1, or from a transmitter T3 and receiver R1, can be determined by multiplying the gain factors $G_{T_1R_1}^{T_2R_1}$ or $G_{T_1R_1}^{T_3R_1}$ by the EM tensor elements from the transmitter T1 and receiver R1.

Using any of the various embodiments described herein and others within the scope of the claims below, one can generate one or more measurements using any of the nine elements of the EM tensor, such as the one defined by a magnitude ratio or a phase difference between two different linear combinations of any of the nine elements of the EM tensor to characterize the formation. One may use the measurement(s) characterizing the formation, for example, for geosteering and formation evaluation, such as by determining the orientation of a formation boundary, the distance to the formation boundary, and/or the resistivity on opposing sides of the formation boundary, etc.

Figure 2A:
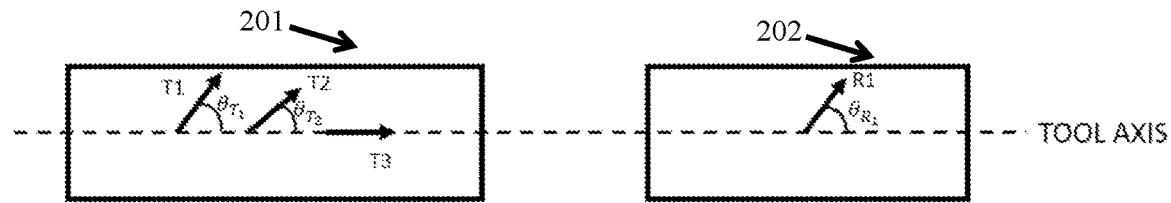
FIG. 2A is a schematic drawing of one embodiment of an electromagnetic logging tool having two tilted transmitters, one axial transmitter, and one tilted receiver, in accordance with the present disclosure.
Figure 2B:
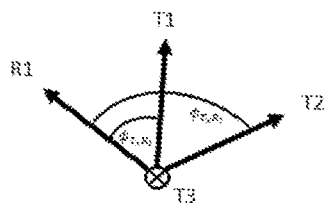
FIG. 2B is an end view of the embodiment of FIG. 2A showing the relative azimuthal angles between the magnetic moments of the tilted transmitters and the tilted receiver, in accordance with the present disclosure.

FIG. 2A is a schematic drawing of an example downhole tool in accordance with an embodiment of the present disclosure. The tool includes transmitter sub 201 and receiver sub 202. Transmitter sub 201 has three transmitter antennas T1, T2, and T3, placed in proximity to each other. T1 and T2 are tilted antennas having magnetic moments neither parallel nor orthogonal to the tool axis. T3 is an axial antenna having a magnetic moment substantially parallel to the tool axis. Receiver sub 202 includes one tilted receiver antenna R1 having a magnetic moment neither parallel nor orthogonal to the tool axis. The magnetic moments of the two tilted transmitter and one tilted receiver antennas are in different azimuthal planes as shown in an end view in FIG. 2B, where $\phi_{T_1R_1}$ and $\phi_{T_2R_2}$ are azimuth angles of T1 and T2 with respect to the receiver R1, respectively. The magnetic moments of the two transmitters T1 and T2 are also in different azimuthal planes. All the transmitter and receiver antennas can operate at multiple frequencies suitable for logging tools. The two subs 201, 202 are spaced apart by a desired distance with one or more logging tools or spacers connected between them. Although the three transmitters are shown placed in proximity, two or all of them can be collocated. Furthermore, although in this described embodiment the three transmitter antennas are located in a different sub than the receiver antenna, all antennas may be placed in the same sub.

When the tilted transmitter T1 transmits electromagnetic field energy at a certain frequency, the induced voltage $V^{T_1R_1}$ ($\phi_{R_1}$) at the receiver R1 can be written according to an equation of the form:

$$V^{T_1R_1}(\phi_{R_1}) = V_0^{T_1R_1} + V_{1c}^{T_1R_1}*\cos\phi_{R_1} + V_{1s}^{T_1R_1}*\sin\phi_{R_1} + V_{2c}^{T_1R_1}*\cos(2\phi_{R_1}) + V_{2s}^{T_1R_1}*\sin(2\phi_{R_1}) \quad \text{Eq. (1)}$$

where $\phi_{R_1}$ is the azimuth angle of the receiver R1 relative to some reference. The five coefficients $V_0^{T_1R_1}$, $V_{1c}^{T_1R_1}$, $V_{1s}^{T_1R_1}$, $V_{2c}^{T_1R_1}$ and $V_{2s}^{T_1R_1}$, with $V_0^{T_1R_1}$ being termed the $0^{th}$ harmonic coefficient, $V_{1c}^{T_1R_1}$ and $V_{1s}^{T_1R_1}$ being termed the $1^{st}$ harmonic coefficients, and $V_{2c}^{T_1R_1}$ and $V_{2s}^{T_1R_1}$ being termed the $2^{nd}$ harmonic coefficients, are linear combinations of the elements of an EM coupling tensor, and can be expressed as follows:

$$V_0^{T_1R_1} = V_{zz}^{T_1R_1}\cos(\theta_{R_1})\cos(\theta_{T_1}) + \tfrac{1}{2}(V_{xx}^{T_1R_1}+V_{yy}^{T_1R_1})\sin(\theta_{R_1})\sin(\theta_{T_1})\cos(\phi_{T_1R_1}) + \tfrac{1}{2}(V_{xy}^{T_1R_1}-V_{yx}^{T_1R_1})\sin(\theta_{R_1})\sin(\theta_{T_1})\sin(\phi_{T_1R_1}) \quad \text{Eq. (2a)}$$

$$V_{1c}^{T_1R_1} = V_{zx}^{T_1R_1}\sin(\theta_{R_1})\cos(\theta_{T_1}) + V_{xz}^{T_1R_1}\cos(\theta_{R_1})\sin(\theta_{T_1})\cos(\phi_{T_1R_1}) + V_{zy}^{T_1R_1}\cos(\theta_{R_1})\sin(\theta_{T_1})\sin(\phi_{T_1R_1}) \quad \text{Eq. (2b)}$$

$$V_{1s}^{T_1R_1} = V_{yz}^{T_1R_1}\sin(\theta_{R_1})\cos(\theta_{T_1}) + V_{zy}^{T_1R_1}\cos(\theta_{R_1})\sin(\theta_{T_1})\cos(\phi_{T_1R_1}) - V_{zx}^{T_1R_1}\cos(\theta_{R_1})\sin(\theta_{T_1})\sin(\phi_{T_1R_1}) \quad \text{Eq. (2c)}$$

$$V_{2c}^{T_1R_1} = \tfrac{1}{2}(V_{xx}^{T_1R_1}-V_{yy}^{T_1R_1})\sin(\theta_{R_1})\sin(\theta_{T_1})\cos(\phi_{T_1R_1}) + \tfrac{1}{2}(V_{xy}^{T_1R_1}+V_{yx}^{T_1R_1})\sin(\theta_{R_1})\sin(\theta_{T_1})\sin(\phi_{T_1R_1}) \quad \text{Eq. (2d)}$$

$$V_{2s}^{T_1R_1} = -\tfrac{1}{2}(V_{xx}^{T_1R_1}-V_{yy}^{T_1R_1})\sin(\theta_{R_1})\sin(\theta_{T_1})\sin(\phi_{T_1R_1}) + \tfrac{1}{2}(V_{xy}^{T_1R_1}+V_{yx}^{T_1R_1})\sin(\theta_{R_1})\sin(\theta_{T_1})\cos(\phi_{T_1R_1}) \quad \text{Eq. (2e)}$$

where $\theta_{T_1}$ is the tilt angle of the magnetic dipole moment of transmitter T1 with respect to the tool axis, $\theta_{R_1}$ is the tilt angle of the magnetic dipole moment of the receiver R1 with respect to the tool axis, and $\phi_{T_1R_1}$ is the azimuth angle of the magnetic moment of the transmitter T1 with respect to that of the receiver R1. It is noted that all nine elements of the EM coupling tensor $V_{xx}^{T_1R_1}$, $V_{xy}^{T_1R_1}$, $V_{xz}^{T_1R_1}$, $V_{yx}^{T_1R_1}$, $V_{yy}^{T_1R_1}$, $V_{yz}^{T_1R_1}$, $V_{zx}^{T_1R_1}$, $V_{zy}^{T_1R_1}$, and $V_{zz}^{T_1R_1}$ contribute to the induced voltage $V^{T_1R_1}$ ($\phi_{R_1}$).

When the tilted transmitter T2 transmits electromagnetic field energy at a certain frequency, the induced voltage $V^{T_2R_1}(\phi_{R_1})$ at the receiver R1 can be written in the same way as Eq. (1) and Eqs. (2) except for replacing index $T_1$ by $T_2$.

Again in this case all nine elements of the EM tensor, $V_{xx}^{T_2R_1}$, $V_{xy}^{T_2R_1}$, $V_{xz}^{T_2R_1}$, $V_{yx}^{T_2R_1}$, $V_{yy}^{T_2R_1}$, $V_{yz}^{T_2R_1}$, $V_{zx}^{T_2R_1}$, $V_{zy}^{T_2R_1}$, and $V_{zz}^{T_2R_1}$ contribute to the induced voltage $V^{T_2R_1}$ ($\phi_{R_1}$). If the two transmitters T1 and T2 are in close proximity or collocated, the nine elements of the EM tensor from transmitter T2 are the same as those from the transmitter T1, apart from a constant factor which is the relative gain factor $G_{T_1R_1}^{T_2R_1}$ due to the construction of the antennas, electronic drifts, etc. In other words:

$$G_{T_1R_1}^{T_2R_1} = \frac{V_{xx}^{T_2R_1}}{V_{xx}^{T_1R_1}} = \frac{V_{xy}^{T_2R_1}}{V_{xy}^{T_1R_1}} = \frac{V_{xz}^{T_2R_1}}{V_{xz}^{T_1R_1}} = \frac{V_{yx}^{T_2R_1}}{V_{yx}^{T_1R_1}} = \frac{V_{yy}^{T_2R_1}}{V_{yy}^{T_1R_1}} = \frac{V_{yz}^{T_2R_1}}{V_{yz}^{T_1R_1}} = \frac{V_{zx}^{T_2R_1}}{V_{zx}^{T_1R_1}} = \frac{V_{zy}^{T_2R_1}}{V_{zy}^{T_1R_1}} = \frac{V_{zz}^{T_2R_1}}{V_{zz}^{T_1R_1}} \quad \text{Eq. (3)}$$

When the axial transmitter T3 transmits electromagnetic field energy at a certain frequency, the induced voltage $V^{T_3R_1}$ ($\phi_{R_1}$) at the receiver R1 can be written according to an equation of the form:

$$V^{T_3R_1}(\phi_{R_1}) = V_0^{T_3R_1} + V_{1c}^{T_3R_1}*\cos\phi_{R_1} + V_{1s}^{T_3R_1}*\sin\phi_{R_1} \quad \text{Eq. (4)}$$

which only involves the $0^{th}$ harmonic coefficient and the $1^{st}$ harmonic coefficients. Those coefficients can be expressed in much simpler forms as follows:

$$V_0^{T_3R_1} = V_{zz}^{T_3R_1}\cos(\theta_{R_1}) \quad \text{Eq. (5a)}$$

$$V_{1c}^{T_3R_1} = V_{xz}^{T_3R_1}\sin(\theta_{R_1}) \quad \text{Eq. (5b)}$$

$$V_{1s}^{T_3R_1} = V_{yz}^{T_3R_1}\sin(\theta_{R_1}) \quad \text{Eq. (5c)}$$

In this case only three elements $V_{xz}^{T_3R_1}$, $V_{yz}^{T_3R_1}$, and $V_{zz}^{T_3R_1}$ of the EM tensor contribute to the induced voltage $V^{T_3R_1}$ ($\phi_{R_1}$). If the transmitter T3 is in close proximity or collocated with T1, the three elements of the EM tensor from transmitter T3 are the same as those from the transmitter T1, apart from a constant factor which is the relative gain factor $G_{T_1R_1}^{T_3R_1}$ due to the construction of the antennas, electronic drifts, etc. In other words:

$$G_{T_1R_1}^{T_3R_1} = \frac{V_{xz}^{T_3R_1}}{V_{xz}^{T_1R_1}} = \frac{V_{yz}^{T_3R_1}}{V_{yz}^{T_1R_1}} = \frac{V_{zz}^{T_3R_1}}{V_{zz}^{T_1R_1}} \quad \text{Eq. (6)}$$

Figure 10A:
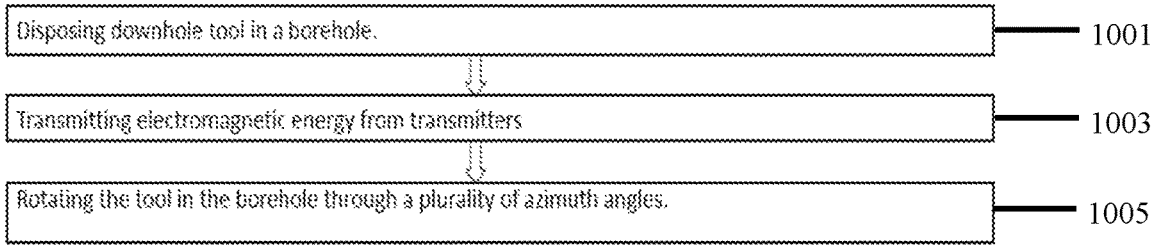
FIG. 10A shows a portion of a flow chart that may be used to determine an electromagnetic coupling tensor, in accordance with the present disclosure.
Figure 10B:
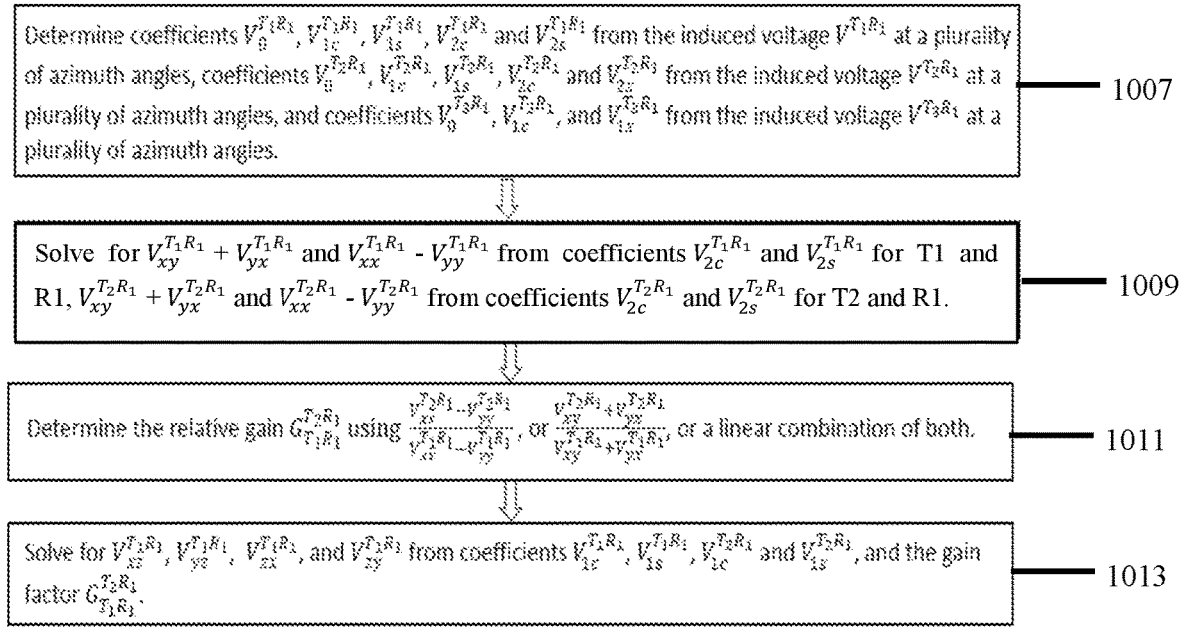
FIG. 10B shows a portion of a flow chart that may be used to determine an electromagnetic coupling tensor, in accordance with the present disclosure.
Figure 10C:
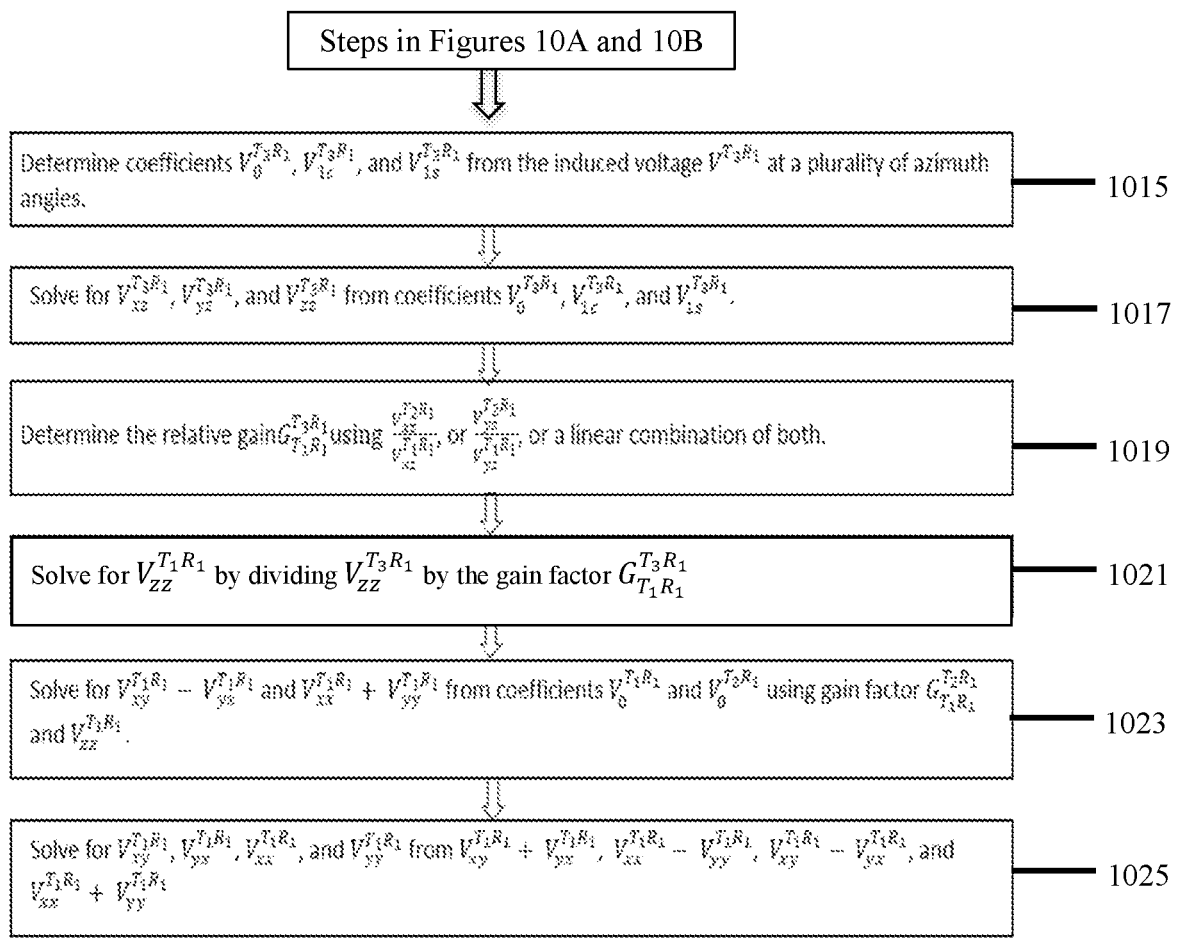
FIG. 10C shows a portion of a flow chart that may be used to determine an electromagnetic coupling tensor, in accordance with the present disclosure.

FIG. 10C, in conjunction with FIGS. 10A and 10B, shows a flowchart for the embodiment of FIG. 2A to determine the EM tensor in accordance with the present disclosure. The downhole tool is disposed in a borehole penetrating a formation (FIG. 10A-1001). In this embodiment, the downhole tool includes at least two tilted transmitters and one axial transmitter placed in proximity to one another or collocated in one sub, and at least one tilted receiver placed in a different sub. The downhole tool transmits EM energy (FIG. 10A-1003) while it is rotated in the borehole (FIG. 10A-1005).

Coefficients $V_0^{T_1R_1}$, $V_{1c}^{T_1R_1}$, $V_{1s}^{T_1R_1}$, $V_{2c}^{T_1R_1}$ and $V_{2s}^{T_1R_1}$ are determined from the induced voltage $V^{T_1R_1}$ at a plurality of azimuth angles, coefficients $V_0^{T_2R_1}$, $V_{1c}^{T_2R_1}$, $V_{1s}^{T_2R_1}$, $V_{2c}^{T_2R_1}$ and $V_{2s}^{T_2R_1}$ are determined from the induced voltage $V^{T_2R_1}$ at a plurality of azimuth angles, and coefficients $V_0^{T_3R_1}$, $V_{1c}^{T_3R_1}$, and $V_{1s}^{T_3R_1}$ are determined from the induced voltage $V^{T_3R_1}$ at a plurality of azimuth angles (FIG. 10B-1007). One can use, but is not limited to, the method described in U.S. Pat. No. 9,389,332 to determine the coefficients.

The sum $V_{xy}^{T_1R_1}+V_{yx}^{T_1R_1}$ and the difference $V_{xx}^{T_1R_1}-V_{yy}^{T_1R_1}$ can be solved for from the 2$^{nd}$ harmonic coefficients $V_{2c}^{T_1R_1}$ and $V_{2s}^{T_1R_1}$ for T1 and R1 using Eqs. (2d) and (2e):

$$V_{xx}^{T_1R_1} - V_{yy}^{T_1R_1} = 2\frac{V_{2c}^{T_1R_1}\cos(\phi_{T_1R_1}) - V_{2s}^{T_1R_1}\sin(\phi_{T_1R_1})}{\sin(\theta_{R_1})\sin(\theta_{T_1})} \quad \text{Eq. (7a)}$$

$$V_{xy}^{T_1R_1} + V_{yx}^{T_1R_1} = 2\frac{V_{2c}^{T_1R_1}\sin(\phi_{T_1R_1}) + V_{2s}^{T_1R_1}\cos(\phi_{T_1R_1})}{\sin(\theta_{R_1})\sin(\theta_{T_1})} \quad \text{Eq. (7b)}$$

Similarly, the sum $V_{xy}^{T_2R_1}+V_{yx}^{T_2R_1}$ and the difference $V_{xx}^{T_2R_1}-V_{yy}^{T_2R_1}$ can be solved for from the 2$^{nd}$ harmonic coefficients $V_{2c}^{T_2R_1}$ and $V_{2s}^{T_2R_1}$ for T2 and R1 using the equations above except for replacing index T1 by T2 (FIG. 10B-1009). The gain factor can be determined by:

$$G_{T_1R_1}^{T_2R_1} = \frac{V_{xx}^{T_2R_1} - V_{yy}^{T_2R_1}}{V_{xx}^{T_1R_1} - V_{yy}^{T_1R_1}} \quad \text{or} \quad \text{Eq. (8a)}$$

$$G_{T_1R_1}^{T_2R_1} = \frac{V_{xy}^{T_2R_1} + V_{yx}^{T_2R_1}}{V_{xy}^{T_1R_1} + V_{yx}^{T_1R_1}} \quad \text{Eq. (8b)}$$

or a linear combination of both, or other ways using $V_{xy}^{T_1R_1}+V_{yz}^{T_1R_1}$, $V_{xx}^{T_1R_1}-V_{yy}^{T_1R_1}$, $V_{xy}^{T_1R_1}+V_{yz}^{T_1R_1}$, and $V_{xx}^{T_1R_1}-V_{yy}^{T_1R_1}$ (FIG. 10B-1011).

One can further solve for $V_{xz}^{T_1R_1}$, $V_{yz}^{T_1R_1}$, $V_{zx}^{T_1R_1}$, and $V_{zy}^{T_1R_1}$ from coefficients $V_{1c}^{T_1R_1}$, $V_{1s}^{T_1R_1}$ using Eqs. (2b) and (2c), and $V_{1c}^{T_2R_1}$ and $V_{1s}^{T_2R_1}$ using the same equations except for replacing the transmitter index T1 by T2, and the gain factor $G_{T_1R_1}^{T_2R_1}$ determined previously (FIG. 10B-1013):

$$\begin{bmatrix} V_{xz}^{T_1R_1} \\ V_{yz}^{T_1R_1} \\ V_{zx}^{T_1R_1} \\ V_{zy}^{T_1R_1} \end{bmatrix} = A^{-1} \begin{bmatrix} V_{1c}^{T_1R_1} \\ V_{1s}^{T_1R_1} \\ V_{1c}^{T_2R_1}/G_{T_1R_1}^{T_2R_1} \\ V_{1s}^{T_2R_1}/G_{T_1R_1}^{T_2R_1} \end{bmatrix} \quad \text{Eq. (9a)}$$

where $A^{-1}$ is the inverse of the following matrix:

$$A = \begin{bmatrix} \sin(\theta_{R_1})\cos(\theta_{T_1}), & 0, & \cos(\theta_{R_1})\sin(\theta_{T_1})\cos(\phi_{T_1R_1}), & \cos(\theta_{R_1})\sin(\theta_{T_1})\sin(\phi_{T_1R_1}) \\ 0, & \sin(\theta_{R_1})\cos(\theta_{T_1}), & -\cos(\theta_{R_1})\sin(\theta_{T_1})\sin(\phi_{T_1R_1}), & \cos(\theta_{R_1})\sin(\theta_{T_1})\cos(\phi_{T_1R_1}) \\ \sin(\theta_{R_1})\cos(\theta_{T_2}), & 0, & \cos(\theta_{R_1})\sin(\theta_{T_2})\cos(\phi_{T_2R_1}), & \cos(\theta_{R_1})\sin(\theta_{T_2})\sin(\phi_{T_2R_1}) \\ 0, & \sin(\theta_{R_1})\cos(\theta_{T_2}), & -\cos(\theta_{R_1})\sin(\theta_{T_2})\sin(\phi_{T_2R_1}), & \cos(\theta_{R_1})\sin(\theta_{T_2})\cos(\phi_{T_2R_1}) \end{bmatrix} \quad \text{Eq. (9b)}$$

The coefficients $V_0^{T_3R_1}$, $V_{1c}^{T_3R_1}$ and $V_{1s}^{T_3R_1}$ can be determined from the induced voltage $V^{T_3R_1}$ at a plurality of azimuth angles (FIG. 10C-1015). One can use, but is not limited to, the method described in U.S. Pat. No. 9,389,332 to determine the coefficients.

One can solve (FIG. 10C-1017) for $V_{xz}^{T_3R_1}$, $V_{yz}^{T_3R_1}$, and $V_{zz}^{T_3R_1}$ from the coefficients $V_0^{T_3R_1}$, $V_{1c}^{T_3R_1}$, and $V_{1s}^{T_3R_1}$ using Eqs. (5a), (5b), and (5c):

$$V_{zz}^{T_3R_1} = V_0^{T_3R_1}/\cos(\theta_{R_1}) \quad \text{Eq. (10a)}$$

$$V_{xz}^{T_3R_1} = V_{1c}^{T_3R_1}/\sin(\theta_{R_1}) \quad \text{Eq. (10b)}$$

$$V_{yz}^{T_3R_1} = V_{1s}^{T_3R_1}/\sin(\theta_{R_1}) \quad \text{Eq. (10c)}$$

Then the gain factor $G_{T_1R_1}^{T_3R_1}$ can be determined by:

$$G_{T_1R_1}^{T_3R_1} = \frac{V_{xz}^{T_3R_1}}{V_{xz}^{T_1R_1}} \quad \text{or} \quad \text{Eq. (11a)}$$

$$G_{T_1R_1}^{T_3R_1} = \frac{V_{yz}^{T_3R_1}}{V_{yz}^{T_1R_1}} \quad \text{Eq. (11b)}$$

or a linear combination of both, or other ways using $V_{xz}^{T_3R_1}$, $V_{yz}^{T_3R_1}$, $V_{xz}^{T_3R_1}$, and $V_{yz}^{T_1R_1}$ (FIG. 10C-1019). The gain factor $G_{T_1R_1}^{T_3R_1}$ can then be used to solve (FIG. 10C-1021) for $V_{zz}^{T_1R_1}$ together with Eq. (10a):

$$V_{zz}^{T_1R_1} = V_0^{T_3R_1}/[(\cos(\theta_{R_1})G_{T_1R_1}^{T_3R_1})] \quad \text{Eq. (12)}$$

One can solve for $V_{xx}^{T_1R_1}+V_{yy}^{T_1R_1}$ and for $V_{xy}^{T_1R_1}-V_{yz}^{T_1R_1}$ from coefficients $V_0^{T_1R_1}$ and $V_0^{T_1R_1}$ using Eq. (2a) for the transmitter T1 and the same equation for transmitter T2 (with index replaced), together with the gain factor $G_{T_1R_1}^{T_2R_1}$ from Eq. (8a) or (8b) and $V_{zz}^{T_1R_1}$ from Eq. (12) (FIG. 10C-1023):

$$V_{xx}^{T_1R_1} + V_{yy}^{T_1R_1} = \quad \text{Eq. (13a)}$$

$$2\frac{(V_0^{T_1R_1} - V_{zz}^{T_1R_1}\cos(\theta_{R_1})\cos(\theta_{T_1}))\sin(\theta_{T_2})\sin(\phi_{T_2R_1}) - (V_0^{T_2R_1}/G_{T_1R_1}^{T_2R_1} - V_{zz}^{T_1R_1}\cos(\theta_{R_1})\cos(\theta_{T_2}))\sin(\theta_{T_1})\sin(\phi_{T_1R_1})}{\sin(\theta_{R_1})\sin(\theta_{T_1})\sin(\theta_{T_2})\sin(\phi_{T_2R_1})}$$

$$V_{xy}^{T_1R_1} - V_{yx}^{T_1R_1} = -2 \quad \text{Eq. (13b)}$$

$$\frac{(V_0^{T_1R_1} - V_{zz}^{T_1R_1}\cos(\theta_{R_1})\cos(\theta_{T_1}))\sin(\theta_{T_2})\cos(\phi_{T_2R_1}) - (V_0^{T_2R_1}/G_{T_1R_1}^{T_2R_1} - V_{zz}^{T_1R_1}\cos(\theta_{R_1})\cos(\theta_{T_2}))\sin(\theta_{T_1})\cos(\phi_{T_1R_1})}{\sin(\theta_{R_1})\sin(\theta_{T_1})\sin(\theta_{T_2})\sin(\phi_{T_2R_1})}$$

where $\phi_{T_2T_1}$ is the difference between the azimuth angles of the magnetic dipole moments of transmitter T1 and T2.

One can solve (FIG. 10C-1025) for $V_{xy}^{T_1R_1}$, $V_{yz}^{T_1R_1}$, $V_{xx}^{T_1R_1}$, and $V_{yy}^{T_1R_1}$ from $V_{xy}^{T_1R_1}+V_{yx}^{T_1R_1}$, $V_{xx}^{T_1R_1}-V_{yy}^{T_1R_1}$, $V_{xy}^{T_1R_1}-V_{yx}^{T_1R_1}$, and $V_{xx}^{T_1R_1}+V_{yy}^{T_1R_1}$ given by Eqs. (13a), (13b), (7a), and (7b). Thus all nine elements of the EM tensor $V_{xx}^{T_1R_1}$, $V_{xy}^{T_1R_1}$, $V_{zy}^{T_1R_1}$, $V_{yx}^{T_1R_1}$, $V_{yy}^{T_1R_1}$, $V_{yz}^{T_1R_1}$, $V_{zx}^{T_1R_1}$, $V_{zy}^{T_1R_1}$, and $V_{zz}^{T_1R_1}$ from the transmitter T1 and receiver R1 are completely determined. Furthermore, since the relative gain factors $G_{T_1R_1}^{T_2R_1}$ and $G_{T_1R_1}^{T_3R_1}$ are also determined, any of the nine element of the EM tensor from transmitter T2 and receiver R1, or that from transmitter T3 and receiver R1 can also be determined by multiplying the gain factor $G_{T_1R_1}^{T_2R_1}$ or $G_{T_1R_1}^{T_3R_1}$ by the EM elements from the transmitter T1 and receiver R1.

It is to be noted that all embodiments of the downhole electromagnetic logging tool disclosed herein have two or more antenna groups spaced along a longitudinal axis of the logging tool, each antenna group having one antenna or multiple antennas proximally located or collocated. Each antenna group also has at least one antenna having a dipole moment that is tilted relative to the longitudinal axis of the logging tool. At least one antenna group has, in addition to the at least one antenna having a dipole moment that is tilted relative to the longitudinal axis of the logging tool, at least one antenna having a dipole moment that is transverse or axial relative to the longitudinal axis of the logging tool, and any given pair of antenna groups comprises at least four antennas.

It is also to be noted that at least one distinguishing aspect between what is claimed herein and the prior art is that the prior art fails to disclose, teach, or otherwise suggest requiring at least one antenna group to have either a transverse antenna or an axial antenna in addition to a tilted antenna. For example, the prior art embodiment shown in FIG. 1A has two antenna groups, each having two tilted antennas, but neither antenna group has a transverse or axial antenna. Similar comments can be made regarding the prior art embodiment of FIG. 1B. The absence of a transverse or axial antenna in conjunction with a tilted antenna in at least one antenna group precludes practicing the method and apparatus described herein.

Figure 3A:
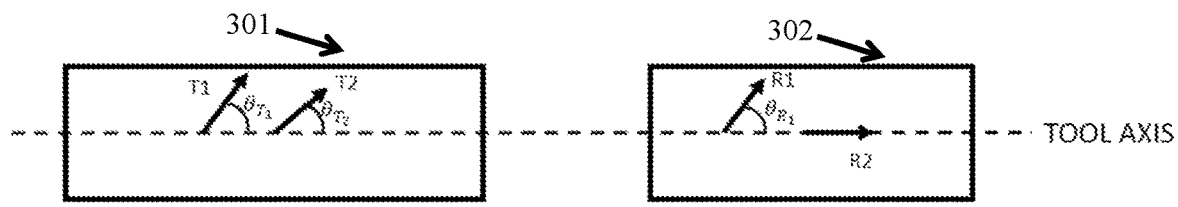
FIG. 3A is a schematic drawing of one embodiment of an electromagnetic logging tool having two tilted transmitters, one axial receiver, and one tilted receiver, in accordance with the present disclosure.
Figure 3B:
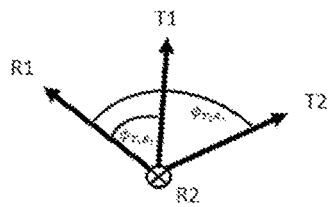
FIG. 3B is an end view of the embodiment of FIG. 3A showing the relative azimuthal angles between the magnetic moments of the tilted transmitters and the tilted receiver, in accordance with the present disclosure.

FIG. 3A is a schematic drawing of an example downhole tool in accordance with another embodiment of the present disclosure. The tool includes transmitter sub 301 and receiver sub 302. Transmitter sub 301 has two transmitter antennas T1 and T2, placed in proximity to each other. T1 and T2 are tilted antennas having magnetic moments neither parallel nor orthogonal to the tool axis. Receiver sub 302 includes one tilted receiver antenna R1 having a magnetic moment neither parallel nor orthogonal to the tool axis, and one axial antenna R2 having a magnetic moment substantially parallel to the tool axis. The magnetic moments of the two tilted transmitter and one receiver antennas are in different azimuthal planes as shown in an end view in FIG. 3B, where $\phi_{T_1R_1}$ and $\phi_{T_2R_1}$ are azimuth angles of T1 and T2 with respect to the receiver R1, respectively. The magnetic moments of the two transmitters T1, T2 are in different azimuthal planes. All the transmitter and receiver antennas can operate at multiple frequencies suitable for logging tools. The two subs 301, 302 are spaced apart by a desired distance with one or more logging tools or spacers connected between them. Although the two receiver are shown placed in proximity, they can be collocated. Furthermore, although the two transmitter antennas are shown located in a different sub than the two receivers, they may be placed in the same sub.

Figure 10D:
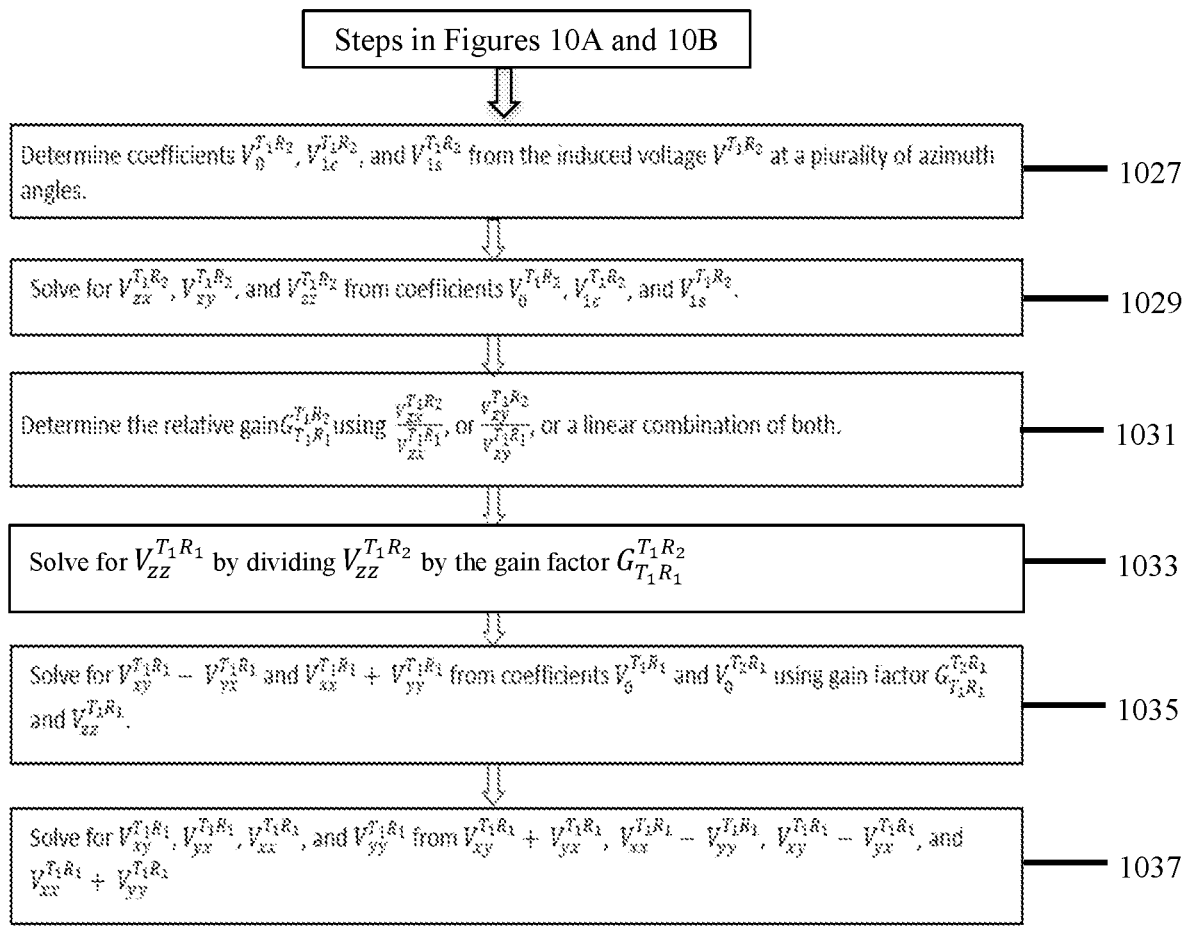
FIG. 10D shows a portion of a flow chart that may be used to determine an electromagnetic coupling tensor, in accordance with the present disclosure.

FIG. 10D, in conjunction with FIGS. 10A and 10B, shows a flowchart for the embodiment of FIG. 3A to determine the EM tensor in accordance with the present disclosure. In this case, we will not have a transmitter T3 and receiver R1 pair. Instead we will have two other transmitter/receiver pairs: the tilted transmitter T1 and axial receiver R2 pair, and the tilted transmitter T2 and axial receiver R2 pair. Therefore, the steps will remain the same except for those involving transmitter T3 and receiver R1, which should be replaced by the transmitter T1 and receiver R2, or the transmitter T2 and receiver R2. In the following we will use the transmitter T1 and receiver R2 to illustrate, but one can do the same using the transmitter T2 and receiver R2 by changing the index T1 to index T2 accordingly.

When the tilted transmitter T1 transmits electromagnetic field energy at a certain frequency, the induced voltage $V^{T_1R_2}(\phi_{T_1})$ at the receiver R2 can be written according to an equation of the form:

$$V^{T_1R_2}((\phi_{T_1}) = V_0^{T_1R_2} + V_{1c}^{T_1R_2} * \cos\phi_{T_1} + V_{1s}^{T_1R_2} * \sin\phi_{T_1} \qquad \text{Eq. (14)}$$

where $\phi_{T_1}$ is the azimuth angle of the magnetic moment of transmitter T1 relative to some reference. The induced voltage $V^{T_1R_2}(\phi_{T_1})$ only involves the $0^{th}$ harmonic coefficient and the $1^{st}$ harmonic coefficients because each term of the $2^{nd}$ harmonic coefficients has a factor of $\sin(\theta_{R_2})$ which equals zero. One can determine coefficients $V_0^{T_1R_2}$, $V_{1c}^{T_1R_2}$ and $V_{1s}^{T_1R_2}$ from the induced voltage $V^{T_1R_2}$ at a plurality of azimuth angles (FIG. 10D-1027). For example, one can use, but is not limited to, the method described in U.S. Pat. No. 9,389,332 to determine the coefficients. The $0^{th}$ and $1^{st}$ harmonic coefficients can be expressed as follows:

$$V_0^{T_1R_2} = V_{zz}^{T_1R_2}\cos(\theta_{T_1}) \qquad \text{Eq. (15a)}$$

$$V_{1c}^{T_1R_2} = V_{zx'}^{T_1R_2}\sin(\theta_{T_1}) \qquad \text{Eq. (15b)}$$

$$V_{1s}^{T_1R_2} = V_{zy'}^{T_1R_2}\sin(\theta_{T_1}) \qquad \text{Eq. (15c)}$$

In this case only three elements of the EM tensor, $V_{zx'}^{T_1R_2}$, $V_{zy'}^{T_1R_2}$, and $V_{zz}^{T_1R_2}$, contribute to the induced voltage $V^{T_1R_2}(\phi_{T_1})$.

One can solve (FIG. 10D-1029) for $V_{zx'}^{T_1R_2}$, $V_{zy'}^{T_1R_2}$, and $V_{zz}^{T_1R_2}$ from the coefficients $V_0^{T_1R_2}$, $V_{1c}^{T_1R_2}$, and $V_{1s}^{T_1R_2}$ using Eqs. (15a), (15b), and (15c):

$$V_{zz}^{T_1R_2} = V_0^{T_1R_2}/\cos(\theta_{T_1}) \qquad \text{Eq. (16a)}$$

$$V_{zx'}^{T_1R_2} = V_{1c}^{T_1R_2}/\sin(\theta_{T_1}) \qquad \text{Eq. (16b)}$$

$$V_{zy'}^{T_1R_2} = V_{1s}^{T_1R_2}/\sin(\theta_{T_1}) \qquad \text{Eq. (16c)}$$

If the receiver R2 is in close proximity or collocated with R1, the three elements of the EM tensor from transmitter T1 and receiver R2 are the same as those from the transmitter T1 and receiver R1, apart from a constant factor which is the relative gain factor $G_{T_1R_1}^{T_1R_2}$ due to the construction of the antennas, the electronic drifts, etc. Then the gain factor $G_{T_1R_1}^{T_1R_2}$ can be variously determined by:

$$G_{T_1R_1}^{T_1R_2} = \frac{V_{zx'}^{T_1R_2}}{V_{zx'}^{T_1R_1}} \text{ or} \qquad \text{Eq. (17a)}$$

$$G_{T_1R_1}^{T_1R_2} = \frac{V_{zy'}^{T_1R_2}}{V_{zy'}^{T_1R_1}} \qquad \text{Eq. (17b)}$$

or a linear combination of both, or other ways using $V_{zx'}^{T_1R_2}$, $V_{zy'}^{T_1R_2}$, $V_{zy'}^{T_1R_1}$, and $V_{zy'}^{T_1R_1}$ (FIG. 10D-1031). The gain factor $G_{T_1R_1}^{T_1R_2}$ can then be used to solve for $V_{zz}^{T_1R_1}$ together with Eq. (16a) (FIG. 10D-1033):

$$V_{zz}^{T_1R_1} = V_0^{T_1R_2}/[(\cos(\theta_{T_1})G_{T_1R_1}^{T_1R_2}] \qquad \text{Eq. (18)}$$

One can use equations Eq. (13a) and (13b) to find (FIG. 10D-1035) $V_{xx}^{T_1R_1} + V_{yy}^{T_1R_1}$ and $V_{xy}^{T_1R_1} - V_{yx}^{T_1R_1}$ where $V_{zz}^{T_1R_1}$ is given by Eq. (18). In that manner, using the same steps as before (FIG. 10D-1037), all nine elements of the EM tensor $V_{zz}^{T_1R_1}$, $V_{xy}^{T_1R_1}$, $V_{xz}^{T_1R_1}$, $V_{yx}^{T_1R_1}$, $V_{yy}^{T_1R_1}$, $V_{yz}^{T_1R_1}$, $V_{zx}^{T_1R_1}$, $V_{zy}^{T_1R_1}$, and $V_{zz}^{T_1R_1}$ from the transmitter T1 and receiver R1 can be completely determined.

One can use the data from the transmitter T2 and receiver R2 pair to derive equations similar to Eqs. (16b) and (16c). As a result, the relative gain $G_{T_1R_2}^{T_2R_2}$ can be easily calculated using $$\frac{V_{zx'}^{T_2R_2}}{V_{zx'}^{T_1R_2}}$$

or $$\frac{V_{zy}^{T_2 R_2}}{V_{zy}^{T_1 R_2}}.$$

One can equate the relative gain factor $G_{T_1 R_1}^{T_2 R_1}$ with $G_{T_1 R_2}^{T_2 R_2}$ and solve for the relative azimuth angle between T1 and R1 (if it is not already known) from the following equation together with Eq. (8a):

$$G_{T_1 R_2}^{T_2 R_2} = \frac{V_{xx}^{T_2 R_1} - V_{yy}^{T_2 R_1}}{V_{xx}^{T_1 R_1} - V_{yy}^{T_1 R_1}} \qquad \text{Eq. (19a)}$$

or from the following equation together with Eq. (8b):

$$G_{T_1 R_2}^{T_2 R_2} = \frac{V_{xy}^{T_2 R_1} + V_{yx}^{T_2 R_1}}{V_{xy}^{T_1 R_1} + V_{yx}^{T_1 R_1}} \qquad \text{Eq. (19b)}$$

Figure 4A:
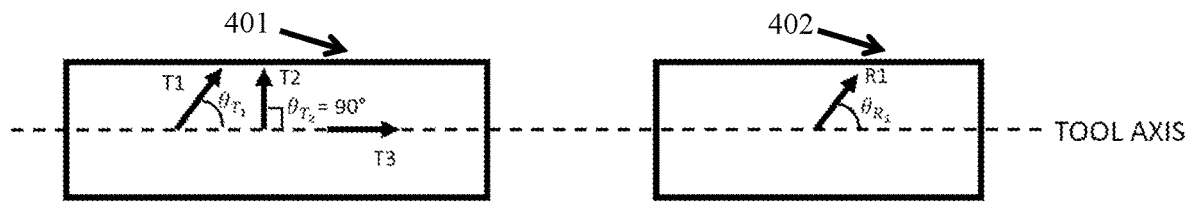
FIG. 4A is a schematic drawing of one embodiment of an electromagnetic logging tool having a tilted transmitter, a transverse transmitter, an axial transmitter, and a tilted receiver, in accordance with the present disclosure.
Figure 4B:
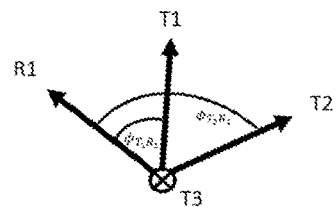
FIG. 4B is an end view of the embodiment of FIG. 4A showing the relative azimuthal angles between the magnetic moments of the tilted transmitter, the transverse transmitter, and the tilted receiver, in accordance with the present disclosure.

FIG. 4A is a schematic drawing of an example downhole tool in accordance with an embodiment of the present disclosure. The tool includes transmitter sub 401 and receiver sub 402. Transmitter sub 401 has three transmitter antennas T1, T2, and T3, placed in proximity to each other. T1 is a tilted antenna having a magnetic moment neither parallel nor orthogonal to the tool axis. T2 is a transverse antenna having a magnetic moment perpendicular to the tool axis. T3 is an axial antenna having a magnetic moment substantially parallel to the tool axis. Receiver sub 402 includes one tilted receiver antenna R1 having a magnetic moment neither parallel nor orthogonal to the tool axis. The magnetic moments of the tilted transmitter, the transverse transmitter, and the receiver antennas are in different azimuthal planes as shown in an end view in FIG. 4B, where $\phi_{T_1 R_1}$ and $\phi_{T_2 R_1}$ are azimuth angles of T1 and T2 with respect to the receiver R1, respectively. All the transmitter and receiver antennas can operate at multiple frequencies suitable for logging tools. The two subs 401, 402 are spaced apart by a desired distance with one or more logging tools or spacers connected between them. Although the three transmitters are shown placed in proximity, two or all of them can be collocated. Furthermore, although this described embodiment the three transmitter antennas are shown located in a different sub than the receiver antenna, they may be placed in the same sub.

When the transverse transmitter T2 transmits electromagnetic field energy at a certain frequency, the induced voltage $V^{T_2 R_1}(\phi_{R_1})$ at the receiver R1 can be written in the same way as Eq. (1) and Eq. (2) except for replacing index $T_1$ by $T_2$, and setting $\theta_{T_2} = \pi/2$. Again in this case all nine elements of the EM tensor, $V_{xx}^{T_2 R_1}$, $V_{xy}^{T_2 R_1}$, $V_{xz}^{T_2 R_1}$, $V_{yx}^{T_2 R_1}$, $V_{yy}^{T_2 R_1}$, $V_{yz}^{T_2 R_1}$, $V_{zx}^{T_2 R_1}$, $V_{zy}^{T_2 R_1}$, and $V_{zz}^{T_2 R_1}$, except for $V_{zz}^{T_2 R_1}$, contribute to the induced voltage $V^{T_2 R_1}(\phi_{R_1})$. If the two transmitters T1 and T2 are in close proximity or collocated, the nine elements (except for $V_{zz}^{T_2 R_1}$, which is zero) of the EM tensor from transmitter T2 are the same as those from the transmitter T1 apart from a constant factor, which is the relative gain factor $G_{T_1 R_1}^{T_2 R_1}$ due to the construction of the antennas, electronic drifts, etc. In other words:

$$G_{T_1 R_1}^{T_2 R_1} = \frac{V_{xx}^{T_2 R_1}}{V_{xx}^{T_1 R_1}} = \frac{V_{xy}^{T_2 R_1}}{V_{xy}^{T_1 R_1}} = \qquad \text{Eq. (20)}$$

$$\frac{V_{xz}^{T_2 R_1}}{V_{xz}^{T_1 R_1}} = \frac{V_{yx}^{T_2 R_1}}{V_{yx}^{T_1 R_1}} = \frac{V_{yy}^{T_2 R_1}}{V_{yy}^{T_1 R_1}} = \frac{V_{yz}^{T_2 R_1}}{V_{yz}^{T_1 R_1}} = \frac{V_{zx}^{T_2 R_1}}{V_{zx}^{T_1 R_1}} = \frac{V_{zy}^{T_2 R_1}}{V_{zy}^{T_1 R_1}}$$

FIG. 10C, in conjunction with FIGS. 10A and 10B, shows a flowchart for the embodiment of FIG. 4A to determine the EM tensor in accordance with the present disclosure. The downhole tool is disposed in a borehole penetrating a formation (FIG. 10A-1001). Recall this embodiment of the downhole tool includes a tilted transmitter, a transverse transmitter, and one axial transmitter placed in proximity or collocated in one transmitter sub, and at least one receiver placed in a different sub. The downhole tool transmits EM energy (FIG. 10A-1003) while it is rotated in the borehole (FIG. 10A-1005).

Coefficients $V_0^{T_1 R_1}$, $V_{1c}^{T_1 R_1}$, $V_{1s}^{T_1 R_1}$, $V_{2c}^{T_1 R_1}$, and $V_{2s}^{T_1 R_1}$ are determined from the induced voltage $V^{T_1 R_1}$ at a plurality of azimuth angles, coefficients $V_0^{T_2 R_1}$, $V_{1c}^{T_2 R_1}$, $V_{1s}^{T_2 R_1}$, $V_{2c}^{T_2 R_1}$, and $V_{2s}^{T_2 R_1}$ are determined from the induced voltage $V^{T_2 R_1}$ at a plurality of azimuth angles, and coefficients $V_0^{T_3 R_1}$, $V_{1c}^{T_3 R_1}$, and $V_{1s}^{T_3 R_1}$ are determined from the induced voltage $V^{T_3 R_1}$ at a plurality of azimuth angles (FIG. 10B-1007). One can use, but is not limited to, the method described in U.S. Pat. No. 9,389,332 to determine the coefficients.

Tensor element linear combinations $V_{xy}^{T_1 R_1} + V_{yx}^{T_1 R_1}$ and $V_{xx}^{T_1 R_1} - V_{yy}^{T_1 R_1}$ can be determined from coefficients $V_{2c}^{T_1 R_1}$ and $V_{2s}^{T_1 R_1}$ for T1 and R1 using Eq. (2d) and (2e):

$$V_{xx}^{T_1 R_1} - V_{yy}^{T_1 R_1} = 2 \frac{V_{2c}^{T_1 R_1} \cos(\phi_{T_1 R_1}) - V_{2s}^{T_1 R_1} \sin(\phi_{T_1 R_1})}{\sin(\theta_{R_1})\sin(\theta_{T_1})} \qquad \text{Eq. (21a)}$$

$$V_{xy}^{T_1 R_1} + V_{yx}^{T_1 R_1} = 2 \frac{V_{2c}^{T_1 R_1} \sin(\phi_{T_1 R_1}) + V_{2s}^{T_1 R_1} \cos(\phi_{T_1 R_1})}{\sin(\theta_{R_1})\sin(\theta_{T_1})} \qquad \text{Eq. (21b)}$$

One can also solve for $V_{xy}^{T_2 R_1} + V_{yx}^{T_2 R_1}$ and $V_{xx}^{T_2 R_1} - V_{yy}^{T_2 R_1}$ from coefficients $V_{2c}^{T_2 R_1}$ and $V_{2s}^{T_2 R_1}$ for T2 and R1 using the same equations except with index T1 replaced by T2, and setting $\theta_{T_2} = \pi/2$ (FIG. 10B-1009) Then the gain factor can be determined variously by:

$$G_{T_1 R_1}^{T_2 R_1} = \frac{V_{xx}^{T_2 R_1} - V_{yy}^{T_2 R_1}}{V_{xx}^{T_1 R_1} - V_{yy}^{T_1 R_1}} \qquad \text{Eq. (22a)}$$

or $$G_{T_1 R_1}^{T_2 R_1} = \frac{V_{xy}^{T_2 R_1} + V_{yx}^{T_2 R_1}}{V_{xy}^{T_1 R_1} + V_{yx}^{T_1 R_1}} \qquad \text{Eq. (22b)}$$

or a linear combination of both, or other ways using $V_{xy}^{T_1 R_1} + V_{yx}^{T_1 R_1}$, $V_{xx}^{T_1 R_1} - V_{yy}^{T_1 R_1}$, $V_{xy}^{T_2 R_1} + V_{yx}^{T_2 R_1}$, and $V_{xx}^{T_2 R_1} - V_{yy}^{T_2 R_1}$ (FIG. 10B-1011).

One can also solve for $V_{xz}^{T_1 R_1}$, $V_{yz}^{T_1 R_1}$, $V_{zx}^{T_1 R_1}$, and $V_{zy}^{T_1 R_1}$ from coefficients $V_{1c}^{T_1 R_1}$, $V_{1s}^{T_1 R_1}$ using Eq. (2b) and (2c) and from coefficients $V_{1c}^{T_2 R_1}$, $V_{1s}^{T_2 R_1}$ using the same equations except with the transmitter index T1 replaced by T2 and setting $\theta_{T_2} = \pi/2$, and the gain factor $G_{T_1 R_1}^{T_2 R_1}$ determined previously (FIG. 10B-1013):

$$\begin{bmatrix} V_{xz}^{T_1R_1} \\ V_{yz}^{T_1R_1} \\ V_{zx}^{T_1R_1} \\ V_{zy}^{T_2R_1} \end{bmatrix} = A^{-1} \begin{bmatrix} V_{1c}^{T_1R_1} \\ V_{1s}^{T_1R_1} \\ V_{1c}^{T_2R_1}/G_{T_1R_1}^{T_2R_1} \\ V_{1s}^{T_2R_1}/G_{T_1R_1}^{T_2R_1} \end{bmatrix} \quad \text{Eq. (23a)}$$

$$V_{xy}^{T_1R_1} + V_{yx}^{T_1R_1} = \quad \text{Eq. (27b)}$$

$$-2\frac{(V_0^{T_1R_1} - V_{zz}^{T_1R_1}\cos(\theta_{R_1})\cos(\theta_{T_1}))\cos(\phi_{T_2R_1}) - (V_0^{T_2R_1}/G_{T_1R_1}^{T_2R_1})\sin(\theta_{T_1})\cos(\phi_{T_1R_1})}{\sin(\theta_{R_1})\sin(\theta_{T_1})\sin(\theta_{T_2})\sin(\phi_{T_2R_1})}$$

where $A^{-1}$ is the inverse of the following matrix:

$$A = \begin{bmatrix} \sin(\theta_{R_1})\cos(\theta_{T_1}), 0, & \cos(\theta_R)\sin(\theta_{T_1})\cos(\phi_{T_1R_1}), & \cos(\theta_{R_1})\sin(\theta_{T_1})\sin(\phi_{T_1R_1}) \\ 0, \sin(\theta_{R_1})\cos(\theta_{T_1}), & -\cos(\theta_{R_1})\sin(\theta_{T_1})\sin(\phi_{T_1R_1}), & \cos(\theta_{R_1})\sin(\theta_{T_1})\cos(\phi_{T_1R_1}) \\ 0, 0, & \cos(\theta_{R_1})\cos(\phi_{T_2R_1}), & \cos(\theta_{R_1})\sin(\phi_{T_2R_1}) \\ 0, 0, & -\cos(\theta_{R_1})\sin(\phi_{T_2R_1}), & \cos(\theta_{R_1})\cos(\phi_{T_2R_1}) \end{bmatrix} \quad \text{Eq. (23b)}$$

One can further determine coefficients $V_0^{T_3R_1}$, $V_{1c}^{T_3R_1}$, and $V_{1s}^{T_3R_1}$ from the induced voltage $V^{T_3R_1}$ at a plurality of azimuth angles (FIG. 10C-1015). For example, one may use, but is not limited to, the method described in U.S. Pat. No. 9,389,332 to determine the coefficients.

One can solve (FIG. 10C-1017) for $V_{xz}^{T_3R_1}$, $V_{yz}^{T_3R_1}$, and $V_{zz}^{T_3R_1}$ and from the coefficients $V_0^{T_3R_1}$, $V_{1c}^{T_3R_1}$, and $V_{1s}^{T_3R_1}$ using Eq. (5a), (5b), and (5c):

$$V_{zz}^{T_3R_1} = V_0^{T_3R_1}/\cos(\theta_{R_1}) \quad \text{Eq. (24a)}$$

$$V_{xz}^{T_3R_1} = V_{1c}^{T_3R_1}/\sin(\theta_{R_1}) \quad \text{Eq. (24b)}$$

$$V_{yz}^{T_3R_1} = V_{1s}^{T_3R_1}/\sin(\theta_{R_1}) \quad \text{Eq. (24c)}$$

Then the gain factor $G_{T_1R_1}^{T_3R_1}$ can be variously determined by:

$$G_{T_1R_1}^{T_3R_1} = \frac{V_{xz}^{T_3R_1}}{V_{xz}^{T_1R_1}} \quad \text{Eq. (25a)}$$

or $$G_{T_1R_1}^{T_3R_1} = \frac{V_{yz}^{T_3R_1}}{V_{yz}^{T_1R_1}} \quad \text{Eq. (25b)}$$

or a linear combination of both, or other ways using $V_{xz}^{T_3R_1}$, $V_{yz}^{T_3R_1}$, $V_{xz}^{T_3R_1}$, and $V_{yz}^{T_3R_1}$ (FIG. 10C-1019). The gain factor $G_{T_1R_1}^{T_3R_1}$ can then be used to solve (FIG. 10C-1021) for $V_{zz}^{T_1R_1}$ together with Eq. (24a):

$$V_{zz}^{T_1R_1} = V_0^{T_3R_1}/[(\cos(\theta_{R_1})G_{T_1R_1}^{T_3R_1})] \quad \text{Eq. (26)}$$

One can also solve for $V_{xx}^{T_1R_1}+V_{yy}^{T_1R_1}$ and for $V_{xy}^{T_1R_1}-V_{yx}^{T_1R_1}$ from coefficients $V_0^{T_1R_1}$ and $V_0^{T_2R_1}$ using Eq. (2a) for the transmitter T1 and the same equation for transmitter T2 (except for replacing index T1 by T2 and setting $\theta_{T_2}=\pi/2$), together with the gain factor $G_{T_1R_1}^{T_2R_1}$ from Eq. (22a) or (22b) and $V_{zz}^{T_1R_1}$ from Eq. (26) (FIG. 10C-1023):

$$V_{xx}^{T_1R_1} + V_{yy}^{T_1R_1} = \quad \text{Eq. (27a)}$$

$$-2\frac{(V_0^{T_1R_1} - V_{zz}^{T_1R_1}\cos(\theta_{R_1})\cos(\theta_{T_1}))\sin(\phi_{T_2R_1}) - (V_0^{T_2R_1}/G_{T_1R_1}^{T_2R_1})\sin(\theta_{T_1})\sin(\phi_{T_1R_1})}{\sin(\theta_{R_1})\sin(\theta_{T_1})\sin(\theta_{T_2})\sin(\phi_{T_2R_1})}$$

where $\phi_{T_2T_1}$ is the difference of the azimuth angles between the magnetic dipole moments of transmitter T1 and T2.

One can further solve (FIG. 10C-1027) for $V_{xy}^{T_1R_1}$, $V_{yx}^{T_1R_1}$, $V_{xx}^{T_1R_1}$, and $V_{yy}^{T_1R_1}$ from $V_{xy}^{T_1R_1}+V_{yx}^{T_1R_1}$, $V_{xx}^{T_1R_1}-V_{yy}^{T_1R_1}$, $V_{xy}^{T_1R_1}-V_{yx}^{T_1R_1}$, and $V_{xx}^{T_1R_1}+V_{yy}^{T_1R_1}$ given by Eqs. (21a), (21b), (27a), and (27b).

Thus, all nine elements of the EM tensor $V_{xx}^{T_1R_1}$, $V_{xy}^{T_1R_1}$, $V_{xz}^{T_1R_1}$, $V_{yx}^{T_1R_1}$, $V_{yy}^{T_1R_1}$, $V_{yz}^{T_1R_1}$, $V_{zx}^{T_1R_1}$, $V_{zy}^{T_1R_1}$, and $V_{zz}^{T_1R_1}$ from the transmitter T1 and receiver R1 are completely determined. Furthermore, since the relative gain factors $G_{T_1R_1}^{T_2R_1}$ and $G_{T_1R_1}^{T_3R_1}$ are also determined, any elements of the EM tensor from transmitter T2 and receiver R1, or from transmitter T3 and receiver R1 can also be determined by multiplying the gain factors $G_{T_1R_1}^{T_2R_1}$ or $G_{T_1R_1}^{T_3R_1}$ to the tensor elements from the transmitter T1 and receiver R1.

Figure 5A:
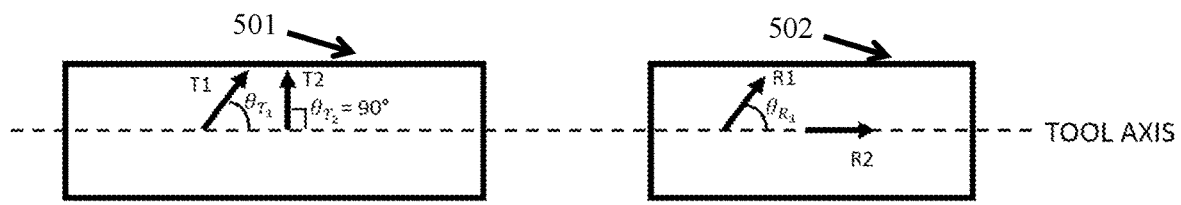
FIG. 5A is a schematic drawing of one embodiment of an electromagnetic logging tool having a titled transmitter, a transverse transmitter, a tilted receiver, and an axial receiver, in accordance with the present disclosure.
Figure 5B:
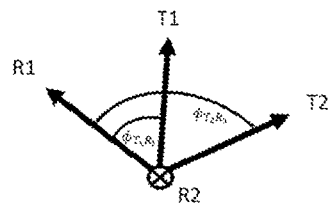
FIG. 5B is an end view of the embodiment of FIG. 5A showing the relative azimuthal angles between the magnetic moments of the tilted transmitter, the transverse transmitter, and the tilted receiver, in accordance with the present disclosure.

FIG. 5A is a schematic drawing of an example downhole tool in accordance with another embodiment of the present disclosure. The tool includes transmitter sub 501 and receiver sub 502. Transmitter sub 501 has two transmitter antennas T1 and T2 placed in proximity to each other. T1 is a tilted antennas having a magnetic moment neither parallel nor orthogonal to the tool axis, and T2 is a transverse antenna having a magnetic moment perpendicular to the tool axis. Receiver sub 502 includes one tilted receiver antenna R1 having a magnetic moment neither parallel nor orthogonal to the tool axis, and one axial antenna R2 having a magnetic moment substantially parallel to the tool axis. The magnetic moments of the two transmitter and the tilted receiver antennas are in different azimuthal planes as shown in an end view in FIG. 5B, where $\phi_{T_1R_1}$ and $\phi_{T_2R_1}$ are azimuth angles of T1 and T2 with respect to the receiver R1, respectively. The two transmitters are in different azimuthal planes. All the transmitter and receiver antennas can operate at multiple frequencies suitable for logging tools. The two subs 501, 502 are spaced apart by a desired distance with one or more logging tools or spacers connected between them. Although the two transmitters are shown placed in proximity, they can be collocated. Furthermore, although the two transmitter antennas are shown located in a different sub than the two receivers, they may be placed in the same sub.

FIG. 10D, in conjunction with FIGS. 10A and 10B, shows a flowchart for the embodiment of FIG. 5A to determine the EM tensor in accordance with the present disclosure. In this case, as compared to the embodiment of FIG. 4A, we will not have the transmitter T3 and receiver R1 pair. Instead we will have two other transmitter/receiver pairs which are: the tilted transmitter T1 and axial receiver R2 pair, and the transverse transmitter T2 and axial receiver R2 pair. Therefore the steps will remain the same except for those involving transmitter T3 and receiver R1, which should be replaced by the transmitter T1 and receiver R2.

When the tilted transmitter T1 transmits electromagnetic field energy at a certain frequency, the induced voltage $V^{T_1R_2}(\phi_{T_1})$ at the receiver R2 can be written according to an equation of the form:

$$V^{T_1R_2}(\phi_{T_1}) = V_0^{T_1R_2} + V_{1c}^{T_1R_2} * \cos\phi_{T_1} + V_{1s}^{T_1R_2} * \sin\phi_{T_1} \quad \text{Eq. (28)}$$

where $\phi_{T_1}$ is the azimuth angle of the magnetic moment of transmitter T1 relative to some reference. The induced voltage $V^{T_1R_2}(\phi_{T_1})$ only involves the $0^{th}$ harmonic coefficient and the $1^{st}$ harmonic coefficients. One can determine coefficients $V_0^{T_1R_2}$, $V_{1c}^{T_1R_2}$ and $V_{1s}^{T_1R_2}$ from the induced voltage $V^{T_1R_2}$ at a plurality of azimuth angles. For example, one can use, but is not limited to, the method described in U.S. Pat. No. 9,389,332 to determine the coefficients. Those coefficients can be expressed in a much simpler form as follows:

$$V_0^{T_1R_2} = V_{zz}^{T_1R_2}\cos(\theta_{T_1}) \quad \text{Eq. (29a)}$$

$$V_{1c}^{T_1R_2} = V_{zx}^{T_1R_2}\sin(\theta_{T_1}) \quad \text{Eq. (29b)}$$

$$V_{1s}^{T_1R_2} = V_{zy}^{T_1R_2}\sin(\theta_{T_1}) \quad \text{Eq. (29c)}$$

In this case only three elements of the EM tensor $V_{zx}^{T_1R_2}$, $V_{zy}^{T_1R_2}$, and $V_{zz}^{T_1R_2}$ contribute to the induced voltage $V^{T_1R_2}(\phi_{T_1})$. If the receiver R2 is in close proximity or collocated with R1, the three elements of the EM tensor from transmitter T1 and receiver R2 are the same as those from the transmitter T1 and receiver R1 apart from a constant factor, which is the relative gain factor $G_{T_1R_1}^{T_1R_2}$ due to the construction of the antennas, the electronic drifts, etc. In other words:

$$G_{T_1R_1}^{T_1R_2} = \frac{V_{zx}^{T_1R_2}}{V_{zx}^{T_1R_1}} = \frac{V_{zy}^{T_1R_2}}{V_{zy}^{T_1R_1}} = \frac{V_{zz}^{T_1R_2}}{V_{zz}^{T_1R_1}} \quad \text{Eq. (30)}$$

One can solve for $V_{zx}^{T_1R_2}$, $V_{zy}^{T_1R_2}$, and $V_{zz}^{T_1R_2}$ from the coefficients $V_0^{T_1R_2}$, $V_{1c}^{T_1R_2}$, and $V_{1s}^{T_1R_2}$ using Eqs. (29a), (29b), and (29c):

$$V_{zz}^{T_1R_2} = V_0^{T_1R_2}/\cos(\theta_{T_1}) \quad \text{Eq. (31a)}$$

$$V_{zx}^{T_1R_2} = V_{1c}^{T_1R_2}/\sin(\theta_{T_1}) \quad \text{Eq. (31b)}$$

$$V_{zy}^{T_1R_2} = V_{1s}^{T_1R_2}/\sin(\theta_{T_1}) \quad \text{Eq. (31c)}$$

Then the gain factor $G_{T_1R_1}^{T_1R_2}$ can be determined by:

$$G_{T_1R_1}^{T_1R_2} = \frac{V_{zx}^{T_1R_2}}{V_{zx}^{T_1R_1}} \quad \text{Eq. (32a)}$$

or $$G_{T_1R_1}^{T_1R_2} = \frac{V_{zy}^{T_1R_2}}{V_{zy}^{T_1R_1}} \quad \text{Eq. (32b)}$$

or any linear combination of both, or other ways using $V_{zx}^{T_1R_2}$, $V_{zy}^{T_1R_2}$, $V_{zx}^{T_1R_1}$, and $V_{zy}^{T_1R_1}$. The gain factor $G_{T_1R_1}^{T_1R_2}$ can then be used to solve for $V_{zz}^{T_1R_1}$ together with Eq. (31a):

$$V_{zz}^{T_1R_1} = V_0^{T_1R_2}/\cos(\theta_{T_1}) G_{T_1R_1}^{T_1R_2} \quad (33)$$

One can use the same equations Eq. (27a) and (27b) to find $V_{xx}^{T_1R_1} + V_{yy}^{T_1R_1}$ and $V_{xy}^{T_1R_1} - V_{yx}^{T_1R_1}$ where $V_{zz}^{T_1R_1}$ is given by Eq. (33). Using the same steps as before all nine elements of the EM tensor $V_{xx}^{T_1R_1}$, $V_{xy}^{T_1R_1}$, $V_{xz}^{T_1R_1}$, $V_{yx}^{T_1R_1}$, $V_{yy}^{T_1R_1}$, $V_{yz}^{T_1R_1}$, $V_{zx}^{T_1R_1}$, $V_{zy}^{T_1R_1}$, and $V_{zz}^{T_1R_1}$ from the transmitter T1 and receiver R1 can be completely determined.

One can use the transmitter T2 and receiver R2 to derive equations similar to Eqs. (31b) and (31c) using transmitter T1 and receiver R2. As a result, the relative gain $G_{T_1R_2}^{T_2R_2}$ can be easily calculated using $$\frac{V_{zx}^{T_2R_2}}{V_{zx}^{T_1R_2}}$$

or $$\frac{V_{zy}^{T_2R_2}}{V_{zy}^{T_1R_2}}.$$

One can equate the relative gain factor $G_{T_1R_1}^{T_2R_1}$ with $G_{T_1R_2}^{T_2R_2}$, and solve for the relative azimuth angle between T1 and R1 (if it is not already known) from the following equation together with Eq. (22a):

$$G_{T_1R_2}^{T_2R_2} = \frac{V_{xx}^{T_2R_1} - V_{yy}^{T_2R_1}}{V_{xx}^{T_1R_1} - V_{yy}^{T_1R_1}} \quad \text{Eq. (34)}$$

or from the following equation together with Eq. (22b):

$$G_{T_1R_2}^{T_2R_2} = \frac{V_{xy}^{T_2R_1} + V_{yx}^{T_2R_1}}{V_{xy}^{T_1R_1} + V_{yx}^{T_1R_1}} \quad \text{Eq. (35)}$$

Figure 6A:
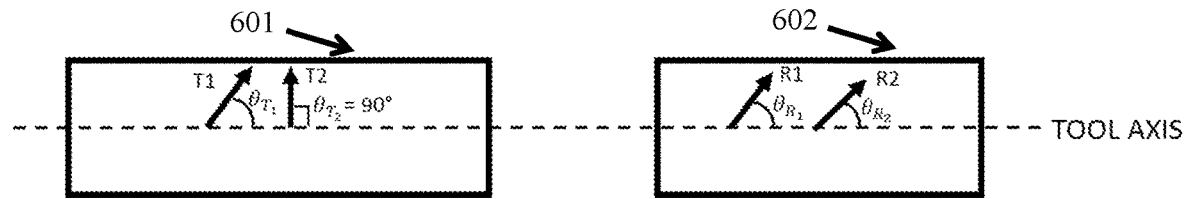
FIG. 6A is a schematic drawing of one embodiment of an electromagnetic logging tool having a tilted transmitter, a transverse transmitter, and two tilted receivers, in accordance with the present disclosure.
Figure 6B:
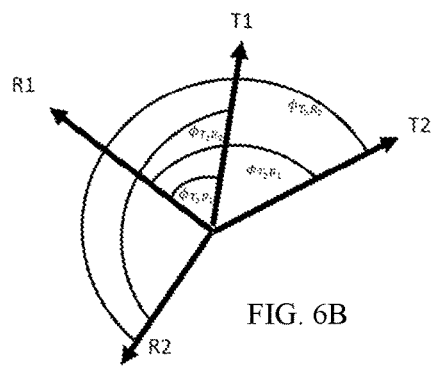
FIG. 6B is an end view of the embodiment of FIG. 6A showing the relative azimuthal angles between the magnetic moments of the tilted transmitter, the transverse transmitter, and the tilted receivers, in accordance with the present disclosure.

FIG. 6A is a schematic drawing of an example downhole tool in accordance with yet another embodiment of the present disclosure. The tool includes transmitter sub 601 and receiver sub 602. Transmitter sub 601 has two transmitter antennas T1 and T2, placed in proximity to each other. T1 is a tilted antenna having a magnetic moment neither parallel nor orthogonal to the tool axis, and T2 is a transverse antenna having a magnetic moment orthogonal to the tool axis. Receiver sub 602 includes two tilted receiver antennas R1 and R2 having magnetic moments neither parallel nor orthogonal to the tool axis. The magnetic moments of the two transmitters and one of the receiver antennas are in different azimuth planes as shown in an end view in FIG. 6B, where $\phi_{T_1R_1}$ and $\phi_{T_2R_1}$ are azimuth angles of T1 and T2 with respect to the receiver R1, respectively. The two transmitters are in different azimuthal planes, and the two receivers are also in different azimuthal planes. All the transmitter and receiver antennas can operate at multiple frequencies suitable for logging tools. The two subs are spaced apart by a desired distance with one or more logging tools or spacers connected between them. Although the two transmitters are shown placed in proximity, they can be collocated. Furthermore, although the two transmitter antennas are shown located in a different sub than the two receivers, they may be placed in the same sub.

Figure 7A:
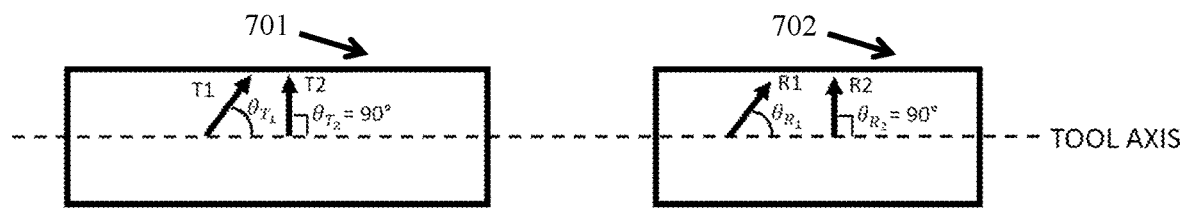
FIG. 7A is a schematic drawing of one embodiment of an electromagnetic logging tool having a tilted transmitter, a transverse transmitter, a tilted receiver, and a transverse receiver, in accordance with the present disclosure.
Figure 7B:
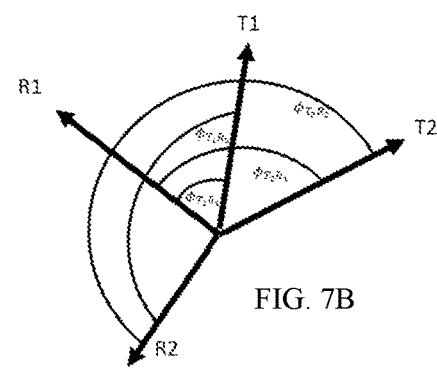
FIG. 7B is an end view of the embodiment of FIG. 7A showing the relative azimuthal angles between the magnetic moments of the tilted transmitter, the transverse transmitter, the tilted receiver, and the transverse receiver, in accordance with the present disclosure.

FIG. 10E, in conjunction with FIG. 10A, shows a flow-chart for the embodiment of FIG. 6A to determine the EM tensor in accordance with the present disclosure. Furthermore, we can replace one the of the tilted receivers, such as R2 in FIG. 6A, with a transverse receiver antenna, i.e., an antenna having a magnetic dipole moment orthogonal to the tool axis, as shown in FIG. 7A, and can still solve for the nine elements of the EM coupling tensor in the same way, except for setting $\theta_{R_2}=\pi/2$ in the corresponding equations. The flowchart shown in FIG. 10E can also be used for this embodiment.

Figure 8A:
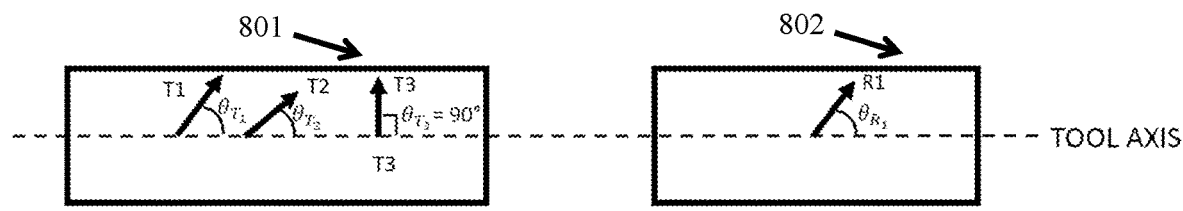
FIG. 8A is a schematic drawing of one embodiment of an electromagnetic logging tool having two tilted transmitters, a transverse transmitter, and a tilted receiver, in accordance with the present disclosure.
Figure 8B:
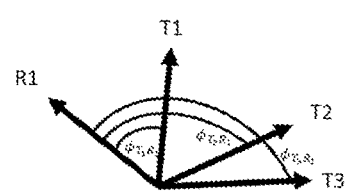
FIG. 8B is an end view of the embodiment of FIG. 8A showing the relative azimuthal angles between the magnetic moments of the tilted transmitters, the transverse transmitter, and the tilted receiver, in accordance with the present disclosure.
Figure 9A:
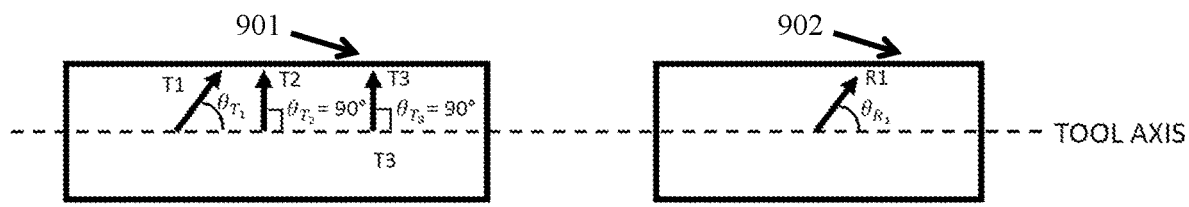
FIG. 9A is a schematic drawing of one embodiment of an electromagnetic logging tool having a tilted transmitter, two transverse transmitters, and a tilted receiver, in accordance with the present disclosure.
Figure 9B:
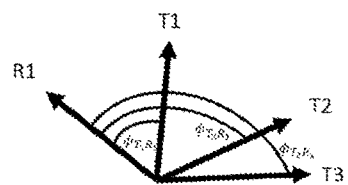
FIG. 9B is an end view of the embodiment of FIG. 9A showing the relative azimuthal angles between the magnetic moments of the tilted transmitter, the transverse transmitters, and the tilted receiver, in accordance with the present disclosure.
Figure 10F:
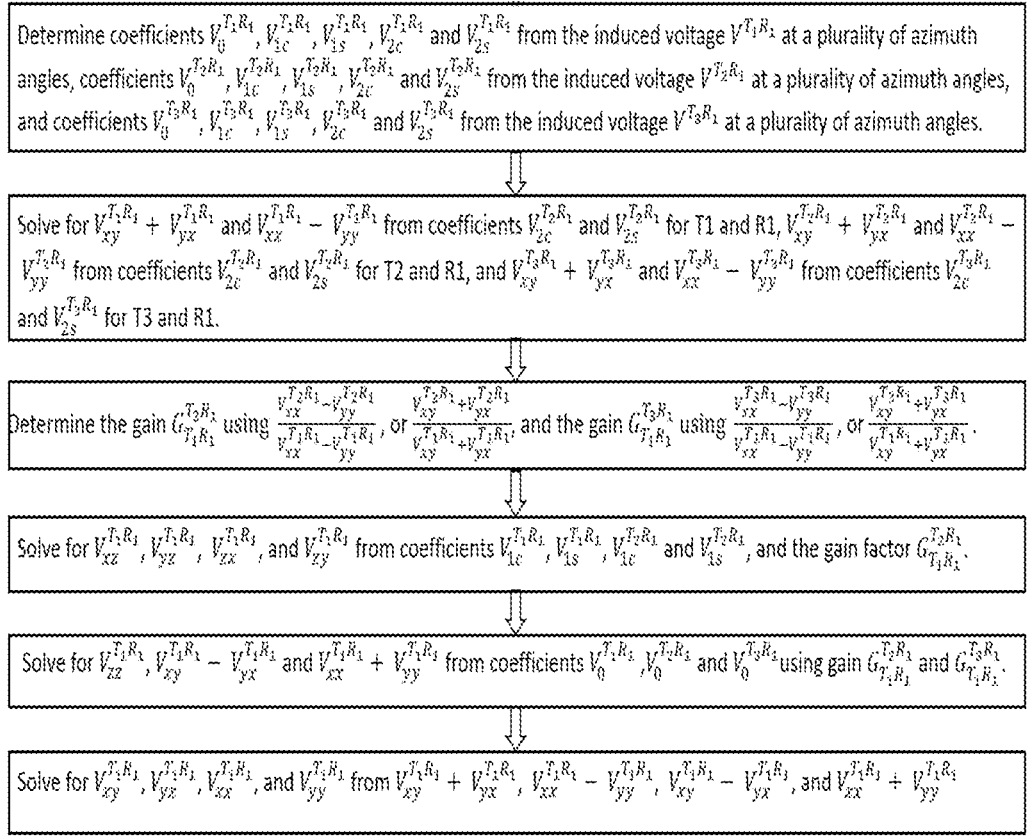
FIG. 10F shows a portion of a flow chart that may be used to determine an electromagnetic coupling tensor, in accordance with the present disclosure.

Alternatively, we can have a tool of two tilted transmitters, a transverse transmitter, and a tilted receiver as shown in FIG. 8A, or a tool of a tilted transmitter, two transverse transmitters, and a tilted receiver as shown in FIG. 9A. For both transmitter configurations, we can still solve for the nine elements of a EM coupling tensor in accordance with the flowchart shown in FIG. 10F.

As is understood in the art, under the principle of reciprocity, the roles of transmitters and receivers can be reversed such that, for example, the antennas in sub 201 can be used as receivers and the antennas in sub 202 can be used as transmitter(s). Furthermore, although only one transmitter sub is shown in the figures, one can extend to embodiments having multiple transmitter subs. Similarly, although only one receiver sub is shown in the figures, one can extend to embodiments having multiple receiver subs.

As is understood in the art, a processor can be incorporated into the system. The processor may be carried on the downhole tool or it may be located on the surface, sending data or instructions to or receiving and processing data from wired or wireless components. The processor may comprise a non-transitory, computer-readable storage medium, which has stored therein one or more programs, the one or more programs comprising instructions to be executed by the processor.

Although a few example embodiments have been described in detail above, those skilled in the art will readily appreciate that many modifications are possible in the example embodiments without materially departing from this disclosure. Accordingly, such modifications are intended to be included within the scope of this disclosure as defined in the following claims. In the claims, means-plus-function clauses are intended to cover the structures described herein as performing the recited function and not simply structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed is:

1. A method, comprising:
providing a downhole electromagnetic logging tool having two or more antenna groups spaced along a longitudinal axis of the logging tool, each antenna group having one antenna or multiple antennas proximately located or collocated, each antenna group having at least one antenna having a dipole moment that is tilted relative to the longitudinal axis of the logging tool, at least one antenna group having at least one other antenna having a dipole moment that is transverse or tilted relative to the longitudinal axis of the logging tool, and any given pair of antenna groups comprising at least four antennas with at most three of those antennas having dipole moments that are tilted relative to the longitudinal axis of the logging tool;
disposing the logging tool in a wellbore penetrating a formation;
rotating the logging tool;
measuring a tool rotation angle while rotating the logging tool;
transmitting an electromagnetic signal from one antenna group while rotating the logging tool;
receiving the electromagnetic signal with another antenna group while rotating the logging tool;
obtaining from the received electromagnetic signal and the measured tool rotation angle sufficient information to determine all of the elements of an electromagnetic coupling tensor;
determining some or all of the elements of the electromagnetic coupling tensor using the obtained information; and
inferring petrophysical properties of the formation using one or more elements of the determined electromagnetic coupling tensor.

2. The method of claim 1, wherein one antenna group is located in a transmitter sub and another antenna group is located in a receiver sub.

3. The method of claim 1, wherein at least two of the multiple antennas in one of the antenna groups are collocated.

4. The method of claim 1, wherein at least two of the antenna groups can operate in a reciprocal manner.

5. The method of claim 1, wherein determining some or all of the elements of the electromagnetic coupling tensor comprises:
determining one or more of the $0^{th}$, $1^{st}$, and $2^{nd}$ harmonic coefficients for a first transmitter/receiver antenna pair within a particular pair of antenna groups using the electromagnetic signal transmitted and received by the first transmitter/receiver antenna pair;
determining one or more of the $0^{th}$, $1^{st}$, and $2^{nd}$ harmonic coefficients for a second transmitter/receiver antenna pair within the particular pair of antenna groups using the electromagnetic signal transmitted and received by the second transmitter/receiver antenna pair;
determining one or more of the $0^{th}$, $1^{st}$, and $2^{nd}$ harmonic coefficients for a third transmitter/receiver antenna pair within the particular pair of antenna groups using the electromagnetic signal transmitted and received by the third transmitter/receiver antenna pair;
determining one or more linear combinations of particular coupling tensor elements using the determined harmonic coefficients;
determining one or more relative gains using the determined one or more linear combinations of particular coupling tensor elements; and
determining other particular coupling tensor elements using the determined harmonic coefficients and one or more of the determined relative gains.

6. The method of claim 5, wherein at least one of the three transmitter/receiver antenna pairs of claim 5 includes a tilted antenna, and at least one of the three transmitter/receiver antenna pairs of claim 5 includes a transverse or axial antenna.

7. The method of claim 1, further comprising making geosteering decisions or performing formation evaluation using the inferred properties.

8. An apparatus, comprising:
two or more antenna groups spaced along a longitudinal axis of an electromagnetic logging tool disposed in a wellbore penetrating a formation, each antenna group having one antenna or multiple antennas proximately located or collocated, each antenna group having at least one antenna having a dipole moment that is tilted relative to the longitudinal axis of the logging tool, at least one antenna group having at least one other antenna having a dipole moment that is transverse or tilted relative to the longitudinal axis of the logging tool, and any given pair of antenna groups comprising at least four antennas with at most three of those antennas having dipole moments that are tilted relative to the longitudinal axis of the logging tool;

a logging tool rotation angle measuring device; and a processor capable of:

controlling the transmission of electromagnetic energy from at least one antenna group;

controlling the reception of electromagnetic energy by at least one other antenna group;

controlling the measurement of a tool rotation angle by the tool rotation angle measuring device;

obtaining from the received electromagnetic energy and the measured tool rotation angle sufficient information to determine all of the elements of an electromagnetic coupling tensor;

determining some or all of the elements of the electromagnetic coupling tensor; and inferring petrophysical properties of the formation using the elements of the electromagnetic coupling tensor.

9. The apparatus of claim 8, wherein one antenna group is located in a transmitter sub and another antenna group is located in a receiver sub.

10. The apparatus of claim 8, wherein the processor can further make geosteering decisions or perform formation evaluation using the inferred properties.

11. The apparatus of claim 8, wherein:

one of the antenna groups has two tilted antennas having dipole moments that are tilted relative to the longitudinal axis of the logging tool and an axial antenna having a dipole moment that is axial relative to the longitudinal axis of the logging tool;

another of the antenna groups has a tilted antenna having a dipole moment that is tilted relative to the longitudinal axis of the logging tool; and wherein none of the planes containing the dipole moment of a tilted antenna and the longitudinal axis are parallel.

12. The apparatus of claim 8, wherein:

one of the antenna groups has two tilted antennas having dipole moments that are tilted relative to the longitudinal axis of the logging tool;

another of the antenna groups has a tilted antenna having a dipole moment that is tilted relative to the longitudinal axis of the logging tool and an axial antenna having a dipole moment that is axial relative to the longitudinal axis of the logging tool; and wherein none of the planes containing the dipole moment of a tilted antenna and the longitudinal axis are co-planar.

13. The apparatus of claim 8, wherein:

one of the antenna groups has a tilted antenna having a dipole moment that is tilted relative to the longitudinal axis of the logging tool, a transverse antenna having a dipole moment that is transverse relative to the longitudinal axis of the logging tool, and an axial antenna having a dipole moment that is axial relative to the longitudinal axis of the logging tool;

another of the antenna groups has a tilted antenna having a dipole moment that is tilted relative to the longitudinal axis of the logging tool; and wherein none of the planes containing the dipole moment of a tilted or transverse antenna and the longitudinal axis are co-planar.

14. The apparatus of claim 8, wherein:

one of the antenna groups has a tilted antenna having a dipole moment that is tilted relative to the longitudinal axis of the logging tool and a transverse antenna having a dipole moment that is transverse relative to the longitudinal axis of the logging tool;

another of the antenna groups has a tilted antenna having a dipole moment that is tilted relative to the longitudinal axis of the logging tool and an axial antenna having a dipole moment that is axial relative to the longitudinal axis of the logging tool; and wherein none of the planes containing the dipole moment of a tilted or transverse antenna and the longitudinal axis are co-planar.

15. The apparatus of claim 8, wherein:

one of the antenna groups has a tilted antenna having a dipole moment that is tilted relative to the longitudinal axis of the logging tool and a transverse antenna having a dipole moment that is transverse relative to the longitudinal axis of the logging tool;

another of the antenna groups has two tilted antennas having dipole moments that are tilted relative to the longitudinal axis of the logging tool; and wherein none of the planes containing the dipole moment of a tilted or transverse antenna and the longitudinal axis are co-planar.

16. The apparatus of claim 8, wherein:

one of the antenna groups has a tilted antenna having a dipole moment that is tilted relative to the longitudinal axis of the logging tool and a transverse antenna having a dipole moment that is transverse relative to the longitudinal axis of the logging tool;

another one of the antenna groups has a tilted antenna having a dipole moment that is tilted relative to the longitudinal axis of the logging tool and a transverse antenna having a dipole moment that is transverse relative to the longitudinal axis of the logging tool; and wherein none of the planes containing the dipole moment of a tilted or transverse antenna and the longitudinal axis are co-planar.

17. The apparatus of claim 8, wherein:

one of the antenna groups has two tilted antennas having dipole moments that are tilted relative to the longitudinal axis of the logging tool and a transverse antenna having a dipole moment that is transverse relative to the longitudinal axis of the logging tool;

another of the antenna groups has a tilted antenna having a dipole moment that is tilted relative to the longitudinal axis of the logging tool; and wherein none of the planes containing the dipole moment of a tilted or transverse antenna and the longitudinal axis are co-planar.

18. The apparatus of claim 8, wherein:

one of the antenna groups has two transverse antennas having dipole moments that are transverse relative to the longitudinal axis of the logging tool and a tilted antenna having a dipole moment that is tilted relative to the longitudinal axis of the logging tool;

another of the antenna groups has a tilted antenna having a dipole moment that is tilted relative to the longitudinal axis of the logging tool; and wherein none of the planes containing the dipole moment of a tilted or transverse antenna and the longitudinal axis are co-planar.

19. A non-transitory, computer-readable storage medium, which has stored therein one or more programs, the one or more programs comprising instructions, which when executed by a processor, cause the processor to perform a method comprising:
- controlling the transmission of electromagnetic energy from at least one antenna group;
- controlling the reception of electromagnetic energy by at least one other antenna group, wherein each antenna group has one antenna or multiple antennas proximately located or collocated, each antenna group has at least one antenna having a dipole moment that is tilted relative to the longitudinal axis of a logging tool, at least one antenna group having at least one other antenna having a dipole moment that is transverse or tilted relative to the longitudinal axis of the logging tool, and any given pair of antenna groups comprising at least four antennas with at most three of those antennas having dipole moments that are tilted relative to the longitudinal axis of the logging tool;
- controlling the measurement of a tool rotation angle by a tool rotation angle measuring device;
- obtaining from the received electromagnetic energy and the measured tool rotation angle sufficient information to determine all of the elements of an electromagnetic coupling tensor;
- determining some or all of the elements of the electromagnetic coupling tensor; and
- inferring petrophysical properties of the formation using the elements of the electromagnetic coupling tensor.

20. The non-transitory, computer-readable storage medium of claim 19, wherein determining some or all of the elements of the electromagnetic coupling tensor comprises:
- determining one or more of the $0^{th}$, $1^{st}$, and $2^{nd}$ harmonic coefficients for a first transmitter/receiver antenna pair within a particular pair of antenna groups using the electromagnetic signal transmitted and received by the first transmitter/receiver antenna pair;
- determining one or more of the $0^{th}$, $1^{st}$, and $2^{nd}$ harmonic coefficients for a second transmitter/receiver antenna pair within the particular pair of antenna groups using the electromagnetic signal transmitted and received by the second transmitter/receiver antenna pair;
- determining one or more of the $0^{th}$, $1^{st}$, and $2^{nd}$ harmonic coefficients for a third transmitter/receiver antenna pair within the particular pair of antenna groups using the electromagnetic signal transmitted and received by the third transmitter/receiver antenna pair;
- determining one or more linear combinations of particular coupling tensor elements using the determined harmonic coefficients;
- determining one or more relative gains using the determined one or more linear combinations of particular coupling tensor elements; and
- determining other particular coupling tensor elements using the determined harmonic coefficients and one or more of the determined relative gains.

* * * * *